US012707554B2

United States Patent

(12) United States Patent
Laberge et al.

(10) Patent No.: US 12,707,554 B2
(45) Date of Patent: Aug. 11, 2026

(54) METHOD AND APPARATUS FOR CONTROLLING PLASMA COMPRESSION

(71) Applicant: GENERAL FUSION INC., Richmond (CA)

(72) Inventors: Michel Georges Laberge, Vancouver (CA); David Franklin Plant, Vancouver (CA); Raphael Segas, Vancouver (CA); William Randolph Smith, II, Vancouver (CA)

(73) Assignee: General Fusion Inc., Richmond (CA)

(*) Notice: Subject to any disclaimer, the term of this patent is extended or adjusted under 35 U.S.C. 154(b) by 649 days.

(21) Appl. No.: 18/259,249

(22) PCT Filed: Dec. 16, 2021

(86) PCT No.: PCT/CA2021/051825
§ 371 (c)(1),
(2) Date: Jun. 23, 2023

(87) PCT Pub. No.: WO2022/155726
PCT Pub. Date: Jul. 28, 2022

(65) Prior Publication Data

US 2024/0062918 A1 Feb. 22, 2024

Related U.S. Application Data

(60) Provisional application No. 63/140,377, filed on Jan. 22, 2021.

(51) Int. Cl.
*H05H 1/02* (2006.01)

(52) U.S. Cl.
CPC .................................... *H05H 1/02* (2013.01)

(58) Field of Classification Search
CPC ... G21B 1/05; G21B 1/11; G21B 1/13; G21B 1/17; H05H 1/02; H05H 1/10; H05H 1/24; H05H 1/50; Y02E 30/10
See application file for complete search history.

(56) References Cited

U.S. PATENT DOCUMENTS 3,523,206 A 8/1970 Drabier
3,668,067 A 6/1972 Christofilos
(Continued)

FOREIGN PATENT DOCUMENTS

CN 101496111 A 7/2009
CN 105185417 A 12/2015
(Continued)

OTHER PUBLICATIONS

Kiuttu et al., "Stabilized Liner Compressor Update," 2018 16th Int'l Conf. on Megagauss Magnetic Field Generation and Related Topics (Megagauss), IEEE, Sep. 25, 2018, pp. 1-7, doi: 10.1109/Megagauss.2018.8722677 (2018).
(Continued)

*Primary Examiner* — Tung X Le
(74) *Attorney, Agent, or Firm* — Knobbe, Martens, Olson & Bear, LLP

(57) ABSTRACT

A control system manipulates one or more of the shape, timing, and magnitude of a pressure pulse ("plasma pulse trajectory") generated by a plasma compression system to implode a liquid liner surrounding a cavity containing plasma, thereby compressing the plasma. The liquid liner and cavity are created by rotating a liquid medium in a vessel. Compression drivers extend perpendicularly around the liquid medium's rotational axis. Multiple layers of compression drivers are stacked in an axial direction parallel to the rotational axis to form multiple pressure zones extending along the rotational axis. The control system separately controls each pressure zone, or groups of pressure zones, to generate individual pressure pulses each having a different pressure pulse trajectory in each pressure zone. The multiple individual pressure pulses collectively form a combined pressure pulse having a pressure pulse trajectory that varies along the rotational axis.

24 Claims, 20 Drawing Sheets

(56) References Cited

U.S. PATENT DOCUMENTS

| | | | | |
|---|---|---|---|---|
| 4,140,057 | A | 2/1979 | Turchi et al. | |
| 4,158,598 | A | 6/1979 | Baird | |
| 4,217,171 | A | 8/1980 | Schaffer | |
| 4,233,537 | A | 11/1980 | Limpaecher | |
| 4,252,605 | A | 2/1981 | Schaffer | |
| 4,252,607 | A | 2/1981 | Thode | |
| 4,263,095 | A | 4/1981 | Thode | |
| 4,269,658 | A | 5/1981 | Ohkawa | |
| 4,626,400 | A | 12/1986 | Jassby | |
| 8,891,719 | B2 | 11/2014 | Howard | |
| 9,271,383 | B2 | 2/2016 | Howard | |
| 9,477,009 | B2 | 10/2016 | Borbiaux | |
| 9,596,745 | B2 | 3/2017 | Laberge | |
| 10,002,680 | B2 | 6/2018 | Laberge et al. | |
| 10,418,170 | B2 | 9/2019 | Rath | |
| 10,798,808 | B2 | 10/2020 | Zimmermann et al. | |
| 10,910,149 | B2 | 2/2021 | Rath | |
| 10,925,145 | B2 | 2/2021 | Sangermano | |
| 11,064,601 | B2 | 7/2021 | Zimmermann | |
| 11,711,884 | B2 * | 7/2023 | Wilkie | H05H 1/01 417/415 |
| 2001/0002680 | A1 | 6/2001 | Kummer | |
| 2005/0129161 | A1 | 6/2005 | Laberge | |
| 2006/0198483 | A1 | 9/2006 | Laberge | |
| 2006/0198486 | A1 | 9/2006 | Laberge et al. | |
| 2011/0158369 | A1 * | 6/2011 | Larson | G21B 3/006 376/107 |
| 2011/0293056 | A1 * | 12/2011 | Slough | H05H 1/02 376/121 |
| 2014/0163939 | A1 | 6/2014 | Bourbiaux | |
| 2015/0216028 | A1 * | 7/2015 | Laberge | H05H 1/105 315/111.61 |
| 2018/0047461 | A1 * | 2/2018 | Cohen | F03H 1/0081 |
| 2019/0139650 | A1 * | 5/2019 | Laberge | G21B 1/21 |
| 2019/0141827 | A1 * | 5/2019 | Gonzalez | H05H 1/22 |
| 2020/0027572 | A1 | 1/2020 | Krasnoff | |
| 2020/0236770 | A1 | 7/2020 | Zimmermann | |
| 2020/0245445 | A1 | 7/2020 | Zimmermann et al. | |
| 2024/0062918 | A1 | 2/2024 | Laberge | |
| 2024/0062919 | A1 | 2/2024 | Zimmermann | |
| 2025/0191790 | A1 | 6/2025 | Howard | |

FOREIGN PATENT DOCUMENTS

| | | | |
|---|---|---|---|
| CN | 205069135 | U | 3/2016 |
| CN | 106158051 | | 11/2016 |
| CN | 107112053 | | 8/2017 |
| CN | 110370260 | | 10/2019 |
| CN | 110785819 | A | 2/2020 |
| CN | 110786080 | A | 2/2020 |
| GB | 2064203 | | 6/1981 |
| JP | 2020518978 | | 6/2020 |
| WO | WO 2008/033587 | | 3/2008 |
| WO | WO 2018/094043 | | 5/2018 |
| WO | WO 2018/201226 | | 11/2018 |
| WO | WO 2022/155725 | A1 | 7/2022 |
| WO | WO 2022/155726 | A1 | 7/2022 |
| WO | WO 2023/173210 | | 9/2023 |

OTHER PUBLICATIONS

Tancetti et al., "Thermal energy confinement time of spherical tokamak plasmas in PI3," Nucl. Fusion, Publ. Section., Vienna, AT, vol. 65, No. 3, Feb. 28, 2025, doi: 10.1088/1741-4326/ADB8FB (2025).

Office Action in Brazil Appl. No. BR112023014326-8 dated Jan. 15, 2026 in four pages.

International Search Report and Written Opinion in PCT/CA2021/051824 mailed on Feb. 4, 2022 in 7 pages.

International Search Report and Written Opinion received in International Application No. PCT/CA2023/050331, dated May 18, 2023.

J. Huneault, "The stability of Impulsively collapsed liquid cavities," McGill University (Canada), 2019.

Ning, et al, "Optimization design of a wire load for Z-pinch plasma implosion experiments" Institute of Applied Physics, vol. 53, No. 3, Mar. 2004.

Gang, et al., "Study on K-shell X-ray production of double-shell neon gas puff Z-pinch" Acta Phys. Sin., vol. 60, No. 1, 2011.

Office Action received in Chinese Application No. 202180091471.6, dated Mar. 18, 2024.

Extended Search Report received in European Application No. 21920164.7 dated Apr. 5, 2024.

International Search Report and Written Opinion for PCT Application No. PCT/CA2021/051825 dated Mar. 4, 2022 in 8 pages.

C.L. Nehl et al., "Retrospective of the ARPA-E Alpha fusion program," J. Fusion Energy vol. 38, No. 5, pp. 506-521 (2019).

Extended Search Report received in European Application No. 21920165.4, dated Apr. 4, 2024.

* cited by examiner

METHOD AND APPARATUS FOR CONTROLLING PLASMA COMPRESSION

TECHNICAL FIELD

The present disclosure generally relates to a method and apparatus for controlling plasma compression.

BACKGROUND

Unless otherwise indicated herein, the materials described in this section are not prior art to the claims in this application and are not admitted to be prior art by inclusion in this section.

Nuclear fusion is the process of combining two nuclei, whereby the reaction releases energy. The release of energy is due to a small difference in mass between the reactants and the products of the fusion reaction and is governed by $dE=dmc^2$. Common reactants are plasma forms of deuterium (a hydrogen nucleus with one proton and one neutron) and tritium (a hydrogen nucleus having one proton and two neutrons). Fusion of these two reactants yields a helium-4 nucleus, a neutron, and energy captured as heat. Achieving fusion of reactants requires high temperature and high pressure (density) of the reactants. Fusion conditions for certain approaches to fusion may be in the order of 800 megapascals of pressure and plasma temperatures of 150 million degrees Celsius.

Plasma is a state of matter similar to gas, and is composed of an ionized gas and free electrons. Plasma comprising ionized fusion reactants inside a reaction vessel can be used to initiate fusion reactions. For example, to achieve conditions with sufficient temperatures and densities for fusion in a plasma, the plasma needs to be positioned, confined, and compressed. Several approaches to manipulate and compress plasmas are known. In one approach, conductive coils are positioned around the circumference of the reaction vessel and are energized with electrical current to produce a magnetic field. This magnetic field interacts with the magnetized plasma to manipulate its shape, position, and in some approaches, its compression (density). Other approaches to achieving fusion conditions involve using strong magnetic fields to compress the plasma, during which adiabatic heating bring the plasma to fusion conditions. Some of these approaches have demonstrated fusion products, however, to date these plasma compression systems have not produced more energy than they consume.

Another approach to achieving fusion conditions is to compress a hydrogen plasma using more conventional means such as mechanical pistons. These mechanical plasma compression systems compress the plasma within the fusion energy device by forming a substantially cylindrical cavity into which the plasma is positioned. The cylindrical cavity is formed by rotating a liquid metal cavity liner such that centrifugal force moves the liquid metal against the walls of the rotating cylinder, forming a liquid liner. The liquid metal liner is collapsed by radially imploding the cavity. The plasma is compressed as the liquid metal liner collapses. During this compression, fusion conditions are achieved, the fusion reaction occurs, and the heat byproduct is released into the liquid metal liner. This heat energy is removed from the fusion energy device by circulating the heated liquid metal through a conventional heat exchanger. This type of plasma compression system is known as Magnetized Target Fusion, hereafter "MTF", and is the plasma compression system used by General Fusion.

Some known systems for forming a cavity in a liquid liner and imploding the liquid liner form a substantially cylindrical cavity that is collapsed by radially imploding a cylindrically shaped liquid liner. An example of such prior art imploding liquid liner system is the LINUS system that was developed in the US Naval Research Laboratory in the 1970s. In the LINUS system a rotating cylindrical liquid metal liner is driven radially by free-pistons. The pistons are driven by a high pressure gas axially causing radial motion of the free-surface of the rotating liquid liner. The initial rotation of the liquid metal is provided by rotating the cylindrical vessel in which the liquid medium is contained. The entire system including the cylindrical vessel and pistons is rotated about its longitudinal axis, so that a cylindrical cavity is formed along and coaxial with the axis of rotation. In hypothetical LINUS systems that would be large enough to produce power on a commercial scale, the rotational mass this system would create very large centripetal structural forces.

Another example of such a prior art system is U.S. Pat. No. 10,002,680 B2 6/2018 Laberge et. al. that was developed by General Fusion Inc. in 2009. In this system, a rotating liquid metal liner creates a vortex cavity within a pressure vessel, and implosion of the liner and compression of plasma injected into the cavity is driven by acoustic pressure waves generated by movable pistons striking anvils positioned radially around the pressure vessel. These pistons move within bores which are fixedly mounted to the outer wall of the pressure vessel.

Another example of such a prior art system is U.S. Pat. No. 10,798,808 B2 10/2020 Zimmerman et al. that was developed by General Fusion Inc. in 2017. In this system, a rotor immersed in a liquid medium circulates the liquid medium to create a liquid liner surrounding a vortex cavity containing plasma, which is then collapsed by compression drivers positioned radially outside of and fixedly mounted to the pressure vessel. In this design, the liquid medium partially fills the compression driver such that the liquid medium spans a gap between the rotor and the non-rotating pressure vessel. The fluid within the annular gap is a liquid. When the rotor circulates the liquid liner, the liquid medium in the gap is subject to large shear forces due to fluid coupling, requiring additional energy to overcome the torque and drive the rotor.

It is desirable to provide an improvement to existing systems for imploding a liquid liner and compressing plasma.

SUMMARY

According to one aspect of the invention, there is provided a plasma compression system comprising a plasma containment vessel comprising a vessel wall, a rotating core, multiple layers of compression drives, and a controller. The rotating core contains a liquid medium and is operable to rotate the liquid medium about a rotational axis to form a liquid liner surrounding a cavity. The rotating core comprises an outer surface spaced from an inner surface of the vessel wall to define an annular gap containing a compression fluid and multiple layers of implosion drivers in fluid communication with the liquid medium and annular gap and spaced along an axial direction parallel to the rotational axis. In some aspects, the compression fluid is a gas. The multiple layers of compression drivers are in fluid communication with the annular gap and are spaced along an axial direction parallel to the rotational axis. Each compression driver layer is operable to generate an individual pressure pulse in the compression fluid in a direction radial to and towards the rotational axis; the multiple layers of compression drivers generate multiple individual pressure pulses that collectively form a combined pressure pulse that actuates the implosion drivers to implode the liquid liner and compresses a plasma in the cavity. The controller is communicative with the multiple layers of compression drivers and is operable to generate multiple individual pressure pulses each having at least one or more different shape, timing, and magnitude, such that the combined pressure pulse has a trajectory that varies along the axial direction. The plasma compression system can further comprise a plasma generator in fluid communication with the vessel and operable to inject a plasma into the cavity.

Each compression driver layer can further comprise multiple compression drivers mounted to the vessel radially around the rotational axis. In one aspect, each compression driver layer also comprises a prime mover communicative with the controller and each compression driver comprises a driver bore and a driver piston movable by the prime mover. Each implosion driver layer can comprise multiple implosion drivers each comprising a pusher bore and a pusher piston in fluid communication with the liquid medium. Each compression driver layer can be in fluid communication with at least one implosion driver layer, wherein the driver piston of each compression driver is in fluid communication with a compression fluid such that movement of the driver pistons by the prime mover compresses the compression fluid, and wherein the at least one implosion driver layer is in fluid communication with the compression fluid such that movement of the pusher pistons by the compressed compression fluid generates the individual pressure pulse in the liquid medium.

The prime mover can comprise an accumulator containing a pressurized driver fluid and a valve communicative with the controller and operable to flow the pressurized driver fluid against the driver piston of each compression driver. Alternatively, the prime mover can comprise an electromagnetic source, electromagnetic coils at a wall of the driver bore, and an electrically-conductive element in the driver piston of each compression driver. The electromagnetic coils can extend along a length the driver bore, and the electromagnetic source can be operable by the controller to adjust the magnetic field along the length of the driver bore thereby controlling the trajectory profile of the driver piston of each compression driver. Alternatively, the prime mover can comprise a mechanical spring.

The plasma compression system can further comprise at least one venting port in the driver bore of each compression driver for venting the driver fluid from the driver bore; in such case, the venting port can comprise a venting valve operable by the controller to adjust a pressure applied to the driver piston by the driver fluid thereby controlling the trajectory profile of the driver piston. Additionally, the venting port can be provided for venting the compression fluid from the driver bore; in such case, the venting port comprises a venting valve operable by the controller to adjust a pressure applied to the driver piston by the compression fluid thereby controlling the trajectory profile of the driver piston.

The plasma compression system can further comprise electrodes at the distal end of the driver bore of each compression driver. These electrodes are operable by the controller to generate an electrical arc to heat the compression fluid thereby controlling the trajectory profile of the driver piston.

In another aspect, each compression driver comprises an accumulator for storing a pressurized gas and a drive valve in fluid communication with the accumulator and a vessel wall opening in the vessel wall. The controller is communicative with the drive valve and is operable to open the drive valve and discharge pressurized compression fluid from the accumulator into the annular gap thereby generating the individual pressure pulse in the compression fluid. Each compression driver can further comprise a relief tank and a rebound valve in fluid communication with the relief tank and the vessel wall opening; the controller is communicative with the rebound valve and is operable to close the drive valve after the pressurized compression fluid has discharged into the annular gap then open the rebound valve, thereby allowing the pressurized compression fluid to flow from the annular gap into the relief tank. The controller can have a processor and a computer-readable memory having encoded thereon instructions that when executed by the processor causes the controller to open the drive valve and close the rebound valve during a compression phase of a compression shot wherein the pressurized gas flows from the accumulator into the annular gap, to keep the drive valve open and the rebound valve closed during a rebound recovery phase of the compression shot wherein some of the pressurized gas flows from the annular gap into the accumulator, and to close the drive valve and open the rebound valve during an energy dissipation phase wherein some other of the pressurized gas flows from the annular gap into the relief tank. Alternatively, the controller can be replaced with a mechanical assembly providing the same function.

The plasma compression system can further comprise annular seals each extending around an exterior surface of the rotating core or an interior surface of the vessel wall. The annular seals can be spaced along an axial direction parallel to the rotational axis and between each compression driver layer.

The multiple layers of compression drivers can comprise at least one central compression driver layer, and top and bottom compression driver layers respectively above and below the at least one central compression driver layer. In such case, the controller is operable to control individual pressure pulses at the top and bottom compression driver layers with a larger magnitude or an earlier timing than the magnitude and timing of the at least one central compression driver layer. The controller can also be operable to adjust at least one of the shape, timing and magnitude of the individual pressure pulses to create a combined pressure pulse having a spherical or ovoid trajectory.

According to another aspect, there is provided a method for compressing plasma, comprising: rotating a rotating core containing a liquid medium about a rotational axis to form a liquid liner surrounding a cavity; injecting plasma into the cavity; and generating multiple individual pressure pulses in the liquid medium from multiple layers of compression drivers spaced along an axial direction parallel to the rotational axis. Each individual pressure pulse travels in a direction perpendicular to and towards the rotational axis. The multiple individual pressure pulses collectively form a combined pressure pulse that actuates multiple implosion drivers in the rotating core to implode the liquid liner and compresses the plasma in the cavity. One or more of the shape, timing, and magnitude of the multiple individual pressure pulses are different such that the combined pressure pulse has a trajectory that varies along the axial direction. The multiple individual pressure pulses can comprise at least one central pressure pulse, a top pressure pulse above the at least one central pressure pulse, and a bottom pressure pulse below the at least one central pressure pulse; the top and bottom pressure pulses can have one or both of a larger magnitude and an earlier timing than the magnitude and timing of the at least one central pressure pulse. The timing and magnitude of the multiple individual pressure pulses can create a combined pressure pulse having a spherical or ovoid trajectory.

In addition to the aspects and embodiments described above, further aspects and embodiments will become apparent by reference to the drawings and study of the following detailed description.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure. Sizes and relative positions of elements in the drawings are not necessarily drawn to scale. For example, the shapes of various elements and angles are not drawn to scale, and some of these elements are arbitrarily enlarged and positioned to improve drawing legibility.

FIGS. 2A and 2B are cross-sectional side views of one pressure zone of the plasma compression system, comprising different embodiments of a compression driver and multiple implosion drivers, each implosion driver comprising a pusher piston and a pusher bore, wherein FIG. 2A shows a compression driver according to a first embodiment, comprising a driver piston and a driver bore, and FIG. 2B shows a compression driver according to a second embodiment, comprising an accumulator in fluid communication with a drive valve, and a relief tank in fluid communication with a rebound valve.

FIGS. 5A through 5E are cross-sectional side views of one compression driver according to the first embodiment and multiple implosion drivers of a pressure zone in operation over a time period, wherein: FIG. 5A shows the compression driver with its driver piston in a start position prior to being triggered with a motive force; FIG. 5B shows the driver piston at approximately one third of its total travel limit within the driver bore; FIG. 5C shows the driver piston as it nears pusher pistons and just before the pusher pistons are accelerated; FIG. 5D shows the driver piston at a distal end of the driver bore while the pusher pistons are accelerated down the pusher bores; and FIG. 5E shows the pusher pistons at the limit of travel within the pusher bore.

FIGS. 6A to 6D are cross-sectional side views of a part of one compression driver according to the second embodiment at different phases during a compression shot, wherein FIG. 6A shows valve states of the compression driver in a pre-shot phase, FIG. 6B shows the valve states in a compression phase, FIG. 6C shows the valve states in a rebound recovery phase, and FIG. 6D shows the valve states in an energy dissipation phase.

FIGS. 8A and B are partial cross-sectional perspective views of different embodiments of the plasma compression system showing the plasma containment vessel with plurality of ports formed in an outer wall of the vessel, compression drivers coupled to the ports of the vessel, and the rotating core, wherein FIG. 8A shows the first embodiment of the compression drivers.

DETAILED DESCRIPTION OF SPECIFIC EMBODIMENTS

Figure 1:
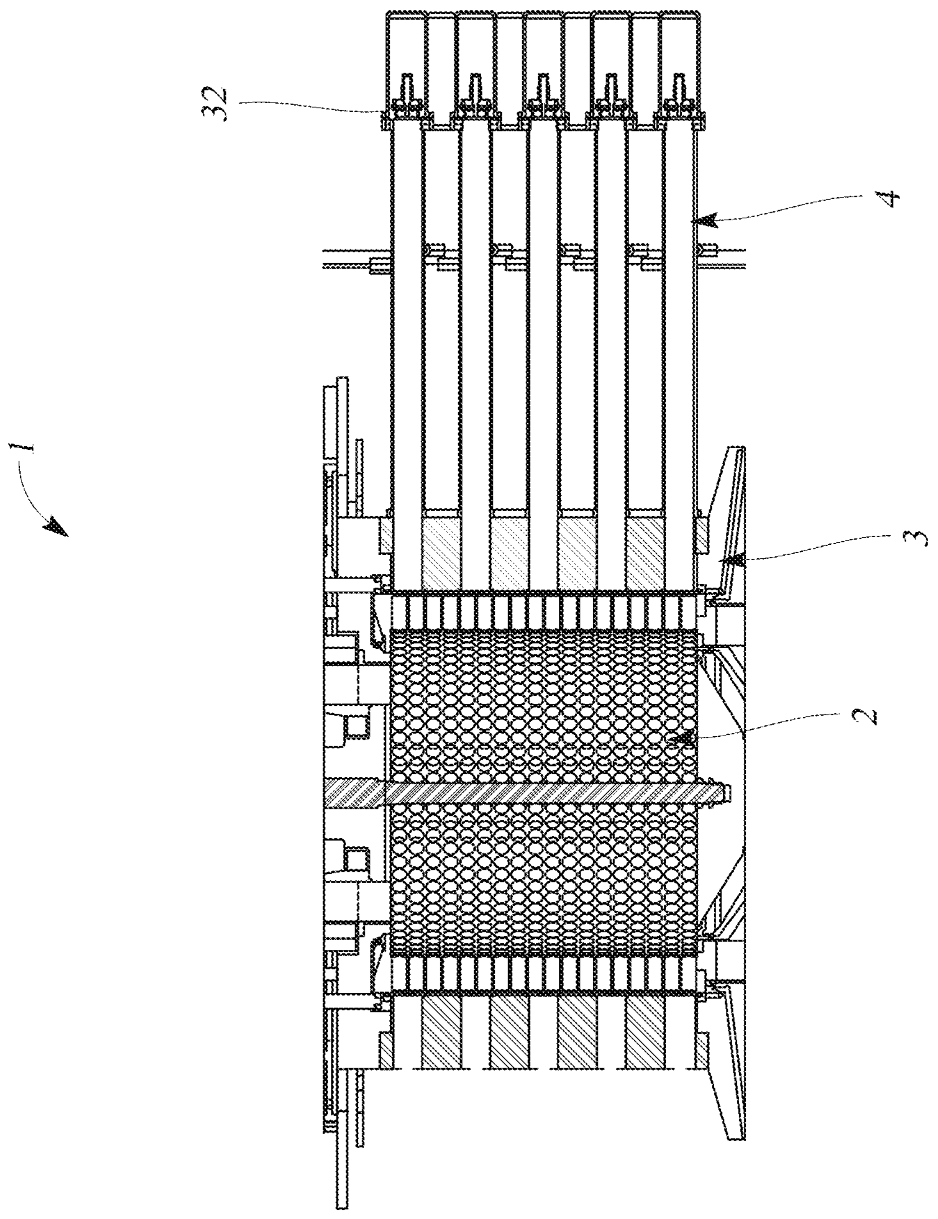
FIG. 1 is a cross-sectional side view of a plasma compression system comprising multiple compression drivers fixedly attached to a plasma containment vessel and a rotating core rotatable within the vessel and comprising multiple implosion drivers, according to one embodiment.

Embodiments described herein relate to a control system and a method operable to manipulate one or more of the shape, timing, and magnitude of a pressure pulse (collectively referred to as "pressure pulse trajectory") generated by a plasma compression system to implode a liquid liner surrounding a cavity containing plasma, thereby compressing the plasma. The liquid liner and cavity are created by rotating a liquid medium in a vessel. A layer of compression drivers extend radially around the liquid medium's rotational axis, and along with one or more layers of implosion drivers in a rotating core rotatable inside the vessel, define a pressure zone having a ring shape. Multiple layers of implosion and compression drivers are stacked axially relative to the rotational axis to form multiple pressure zones extending in a direction parallel to the rotational axis. The control system separately controls each pressure zone, or groups of pressure zones, to generate individual pressure pulses each having a different pressure pulse trajectory in each pressure zone or groups of pressure zones. The multiple individual pressure pulses collectively form a combined pressure pulse having a pressure pulse trajectory that varies along the rotational axis (herein referred to as "shaped pressure pulse trajectory"). This combined pressure pulse creates an implosion trajectory of the liquid liner that also varies along the rotational axis. In some embodiments, the control system generates a combined pressure pulse having a shaped pressure pulse trajectory that produces a substantially spherical or ovoid liquid liner implosion trajectory.

Referring to FIGS. 1-15 and according to some embodiments, the plasma compression system 1 comprises a plasma containment vessel 3, an annular rotating core 2 rotatable inside the vessel 3 and having a plurality of implosion drivers 5, and a plurality of compression drivers 4, 40 fixedly mounted to the outside of the vessel 3. The plasma containment vessel 3 has an outer wall with a plurality of ports 12, and the rotating core 2 has an outer surface spaced from an inner surface of the vessel wall 3 to define an annular gap 10 (see FIGS. 2, 4), and an inner surface that defines an interior volume. The vessel 3 and rotating core 2 in the illustrated embodiment are cylindrical; however, the vessel 3 and rotating core 2 can have different geometries according to alternative embodiments. For example, the vessel 3 can be spherical or ovoid (not shown), and the rotating core 2 can have an outer surface that is straight (cylindrical) or curved with a curvature conforming to the curvature the inside of the vessel wall 3, and an inner surface that can be straight (cylindrical) or curved (not shown). In another example, the inner wall of the vessel 3 can have circular steps of varying radial diameters (not shown), and the rotating core 2 can have an outer surface that is stepped with radial diameters conforming to the steps in the inner wall of the vessel. The rotating core 2 may consist of a unitary cylindrical unit, or in an alternative embodiment may consist of multiple, shaped sections (not shown) that are joined together to form the rotating core 2. The construction of the rotating core 2, or its sections, may use traditional metal forming and millwright techniques, or may use metal printing techniques to create an internal webbed structure that optimizes the topology and stress loading within the rotating core 2.

The construction of the vessel 3 may be a singular cylinder, or in an alternative embodiment the vessel 3 may be assembled from a series of stacked rings (not shown) having an outer surface that is straight (cylindrical) or curved with a curvature conforming to the curvature of the inner wall of the vessel 3, and an inner surface that can be straight (cylindrical) or curved (not shown). The assembled rings may be joined by means known in the prior art, for example by welding the stacked ring interfaces or by use of means to apply tensioned force to the stacked ring assembly, such as bolts.

In these embodiments, the compression drivers 4, 40 extend around the vessel 3 and perpendicularly to the rotating core's rotational axis, and are arranged in axially stacked layers extending in a direction parallel to the rotational axis. In other embodiments, the compression drivers 4, 40 can be mounted in a different orientation, and for example, can be mounted non-perpendicularly to the rotational axis. The implosion drivers 5 extend through the rotating core 2 and perpendicularly to the rotational axis, and are arranged in axially stacked layers extending in a direction parallel to the rotational axis. Each layer of compression drivers 4 align with one or more layers of implosion drivers 5 to define a pressure zone extending perpendicularly to the rotational axis. Multiple axially stacked pressure zones extend in a direction parallel to the rotational axis.

The rotating core 2 contains a liquid medium which can be circulated by the rotating core 2 about the rotational axis to create a generally cylindrical liquid liner 27 surrounding a substantially cylindrical cavity 28 (see FIG. 14A) into which plasma can be injected. A controller 32 comprises a processor and a memory having encoded thereon program code executable by the processor to perform a compression operation wherein the compression drivers 4 are operated to compress a compression fluid in each pressure zone to create individual pressure pulses each having a selected pressure pulse trajectory. The individual pressure pulses together form a combined pressure pulse with a shaped pressure pulse trajectory and which is transmitted across the annular gap 10, which causes the implosion drivers 5 to push the liquid medium inwards to collapse the liquid liner 27 according to a desired implosion trajectory and compress the plasma. The liquid medium can be a liquid metal such as molten lithium and the compression fluid can be a light gas such as helium.

According to a first embodiment and referring particularly to FIGS. 2A, 4, 5A-5E, 7A, 8A and 13A-13E, the compression drivers 4 each comprise a driver bore 13 and a driver piston slideable therein to compress the compression fluid ("two-stage compression driver embodiment"). A driver wall 14 is fixedly mounted to an outer surface of the vessel wall 3, and the driver bore 13 has a distal end in fluid communication with a corresponding port 12 in the vessel wall 3. The implosion drivers 5 each comprise a pusher bore 9 with a pusher piston 6 slideable therein. The pusher bore 9 extends through the rotating core 2 and has a proximal end 7 in fluid communication with the annular gap 10 and a distal end 8 in fluid communication with the liquid medium. The compression fluid fills the annular gap 10 and is in fluid communication with the driver and pusher pistons 15, 6.

When the rotating core 2 rotates by means of electric drive motors, steam turbine or other form of rotational drive, the liquid medium fills the pusher bores 9 due to centripetal force and the liquid liner 27 defining the cavity 28 is formed. A plasma generator 29 (see FIG. 15) injects plasma into this cavity. Since the liquid medium is fully contained within the rotating core 2 (i.e. not contacting the vessel wall 3), it is in solid body rotation with minimal turbulence or cavity surface perturbation. In a compression operation, a controller 32 actuates a prime mover which pushes the driver pistons 15 toward the port 12 in the vessel wall 3, thereby compressing the compression fluid in the annular gap 10 and creating the pressure pulse. This applies pressure on the pusher pistons 6, such that the pusher pistons 6 push the liquid medium inwards to collapse the liquid liner 27 and compress the plasma. A shear layer of the compression fluid is formed in the annular gap 10; since the shear layer is a light gas, the power required to drive the rotating core 2 is significantly lower compared to a design which uses a rotor immersed in the liquid medium and creates a shear layer of the liquid medium.

Each implosion driver 5 has a pusher piston 6 with a mass that is lower than a mass of the driver piston 15, and a pusher bore 9 with a length that is shorter than a length of the driver bore 13. This enables the compression drivers 4 to convert a longer, lower power mechanical input in the compression drivers 4 into a shorter, higher power mechanical output in the implosion drivers 5, which can be useful in applications that require a brief pulse of high pressure. Additionally, the piston mass ratio and bore length ratio for the implosion drivers 5 and compression drivers 4 in each pressure zone can be selected to shape the pressure pulse trajectory of the individual pressure pulse produced in each pressure zone.

For example, the piston mass ratio and bore length ratio for implosion drivers 5 and compression drivers 4 in the top and bottom pressure zones can be selected to produce individual pressure pulses with a higher amplitude than the individual pressure pulse produced in a pressure zone in between the top and bottom pressure zones.

Figure 2A:
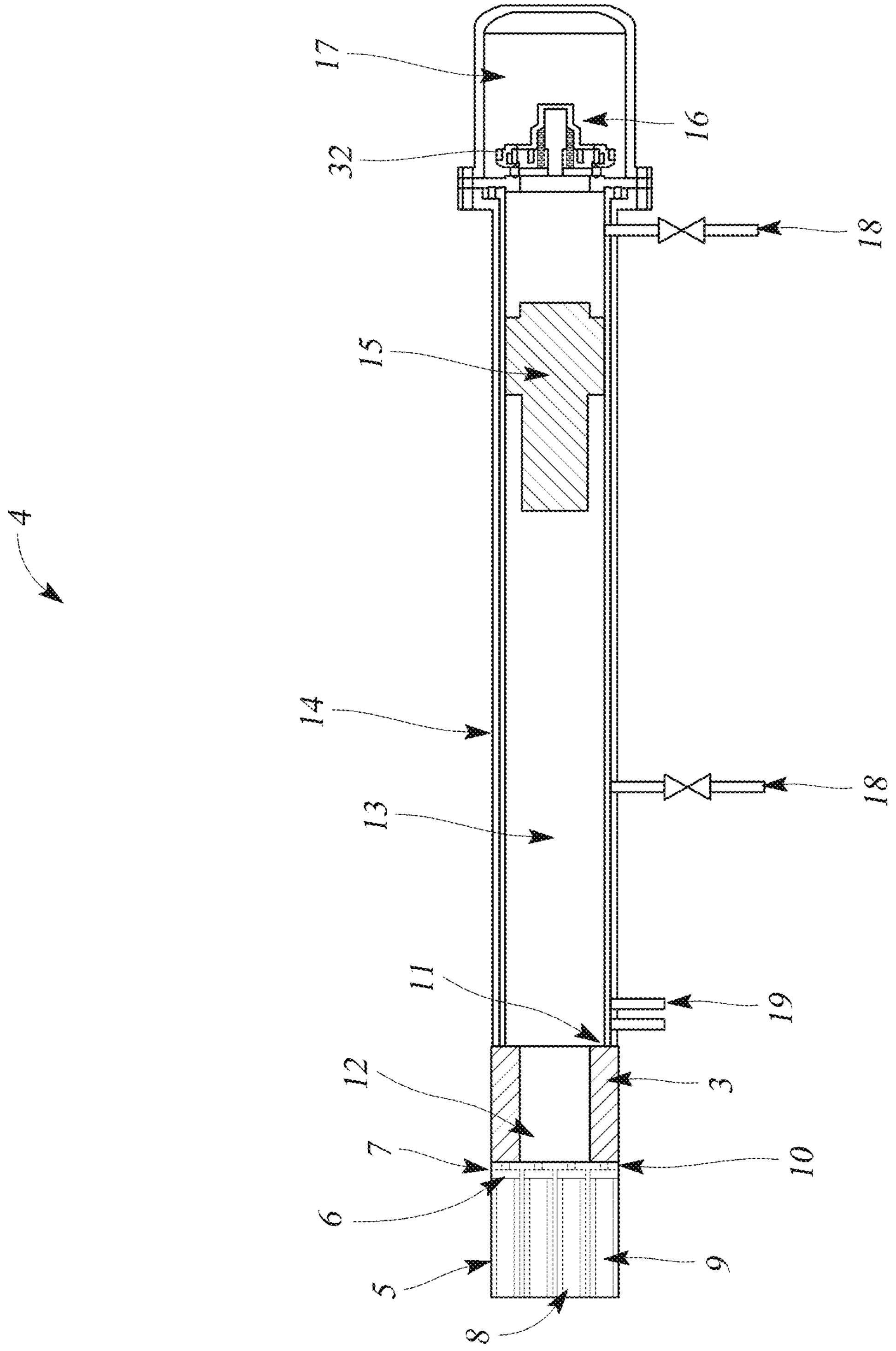
Figure 2B:
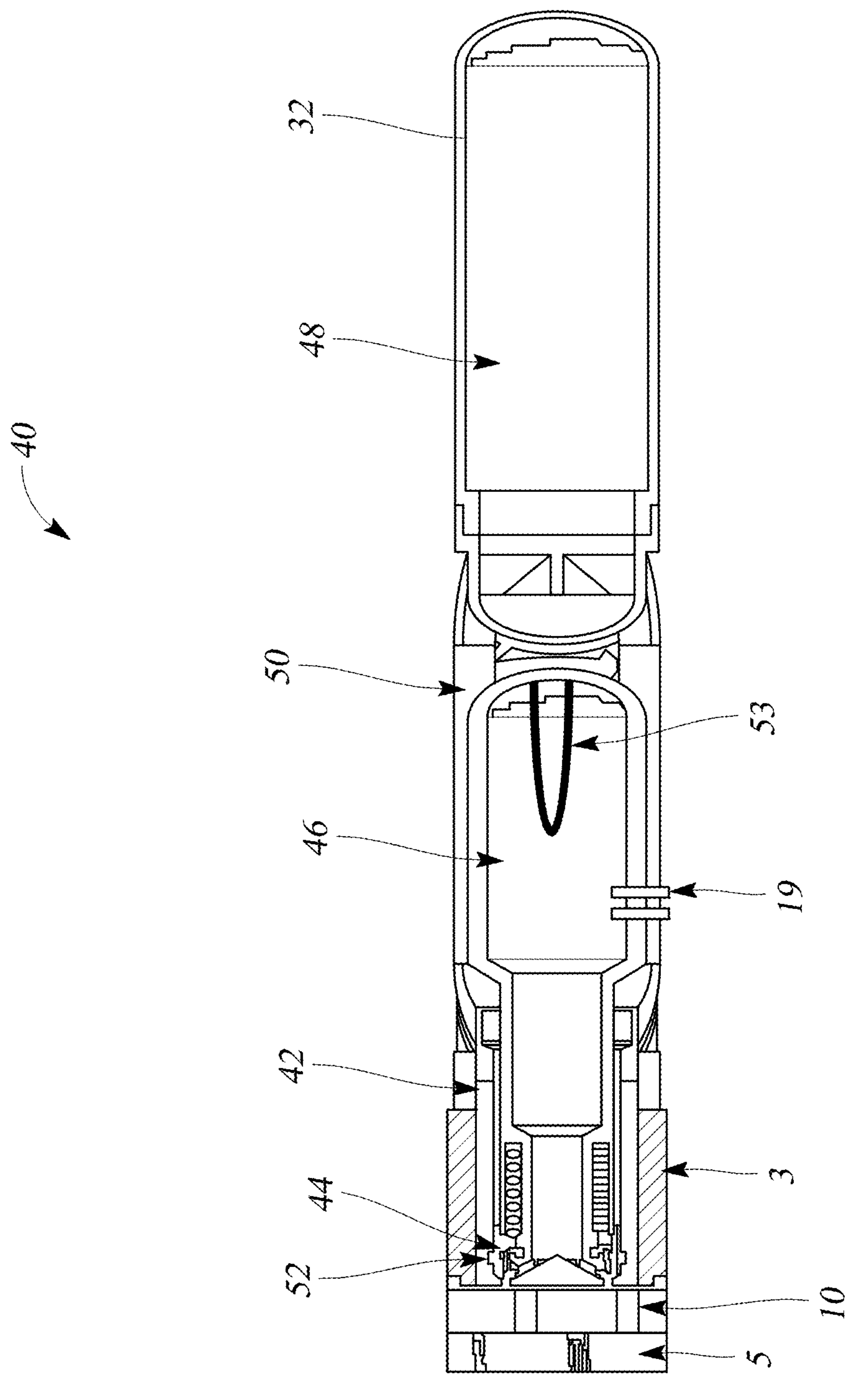
Figure 3:
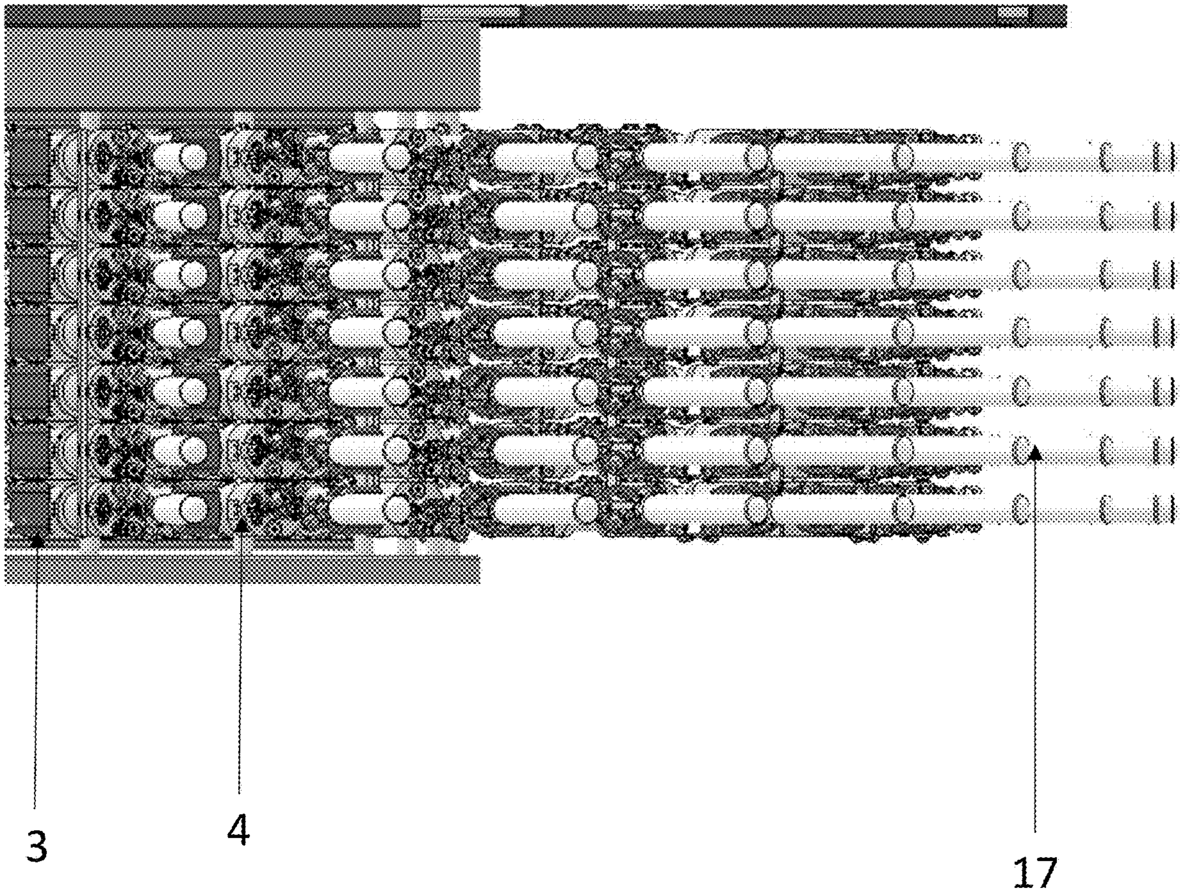
FIG. 3 is a photograph of some of the compression drivers attached to the vessel, according to a prototype embodiment.

Referring particularly to FIGS. 1 and 2A, the controller 32 is communicative with and operable to control the operation of the compression drivers 4 in a pressure zone to manipulate the shape, timing and magnitude of an individual pressure pulse in the pressure zone, which in turn manipulates the implosion trajectory of the liquid liner 27 by the implosion drivers 5. The prime mover in this embodiment comprises an accumulator 17 coupled to a proximal end of the driver bore 13 by a valve 16; the controller 32 controls the operation of the valve 16, which can be opened to discharge a high pressure gas ("driver fluid") to move the driver piston 15 and compress compression fluid in the driver bore 13 in front of the driver piston 15. For the purpose of this application, the compression fluid means any fluid that can be compressed and can in one implementation be a gas. In another implementation, the compression fluid can be a mixture of a gas and a liquid medium, as long as the compression fluid in the driver bore 13 between the pistons 15 and 6 is compressible. In the illustrated embodiment, each compression driver 4 comprises its own accumulator 17; however in alternative embodiments, multiple compression drivers 4 can share a single accumulator, for example, one accumulator can be provided for each layer of compression drivers 4 or to groups of two or more layers (not shown). The controller 32 is communicative with each accumulator 17 to control each individual compression driver 4 in some embodiments, or to control each layer or groups of layers of compression drivers 4 in other embodiments.

In alternative embodiments, the prime mover can comprise an electromagnetic source, or the prime mover can comprise a mechanical spring. The driver piston 25 is composed of an electrically conductive material and electromagnetic coils (not shown) can wind around the driver bore 13, and can be controlled by the controller 32 to drive the driver piston 15 along the driver bore 13.

Figure 5A:
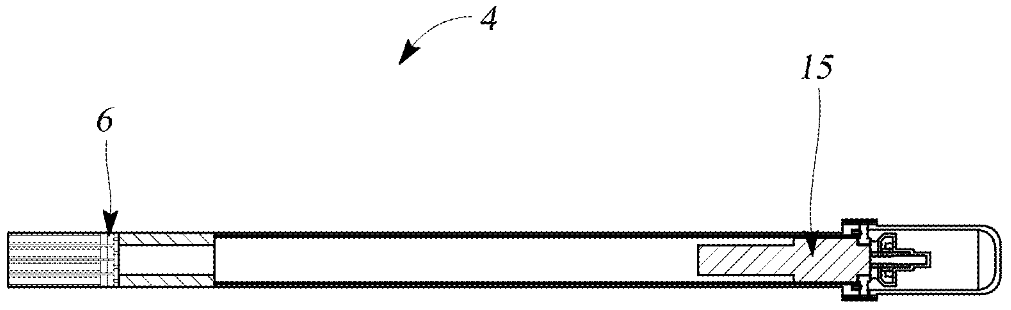
Figure 5B:
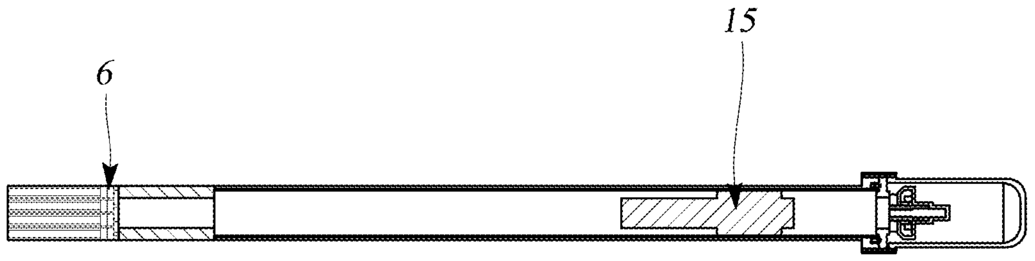
Figure 5C:
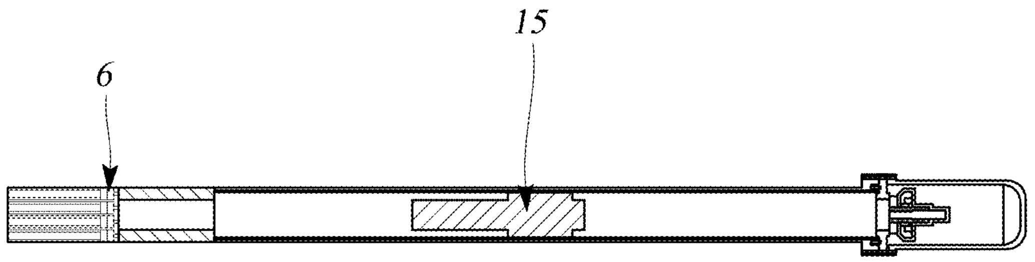
Figure 5D:

Prior to a compression operation, the driver and pusher pistons 15, 6 are in an initial position (see FIG. 5A). In the initial position, the compression fluid fills the driver bore 13 in front of driver piston 15 and the annular gap 10, and is in fluid communication with the pusher pistons 6; the pressure of the compression fluid between the pistons 15 and 6 in their initial positions is significantly less than the driver fluid pressure in the accumulator 17. For example, in one implementation the pressure of the compression fluid can be about 0.5 MPa, however it can be less or more than 0.5 MPa as long as it is significantly lower than the pressure of the driver fluid of the accumulator 17.

The pusher bores 9 will be filled with the liquid medium when the rotating core 2 rotates, such that the liquid medium pushes on the inner face of the pusher pistons 6, due to the centripetal force resulting from the rotation of the rotating core 2. In another implementation, a gas, mechanical means, or magnetic field can also apply pressure to the pusher piston 6 to prevent the pusher piston from being inadvertently accelerated down the pusher bore 9 (until a pre-determined/desired time). A retaining means, such as for example a ledge (not shown), can be provided at/near the open end 8 of the pusher bore 9 to prevent the pusher piston 6 from being dislodged out of the pusher bore 9. In addition, an additional retaining means can be provided at the proximal end (not shown) in order to prevent the pusher piston 6 being pushed into the annular gap 10 due to the pressure applied from the liquid medium in the pusher bore 9.

The driver and the pusher pistons 15, 6 can be made of any suitable material, such as for example, a stainless steel or a titanium alloy or any other suitable material that does not react with the liquid medium and/or the driver fluid and/or the compression fluid. In this embodiment, a diameter of each of the driver bores 13 and the driver pistons 15 is greater than a diameter of each of the pusher bores 9 and the pusher pistons 6; however, the diameter of each pusher bore 9 (pusher piston 6) can be the same or larger than the diameter of each driver bore 13 (driver piston 15) in alternative embodiments.

The valve 16 can be any kind of controllable fast valve. For example, the valve 16 can be a gas driven pneumatic valve or an electromagnetic valve or any other suitable fast acting valve. The valve size and driver fluid pressure can be selected to allow a sufficient flow rate to accelerate the driver piston 15 down the driver bore 13 within a target time period.

Figure 4:
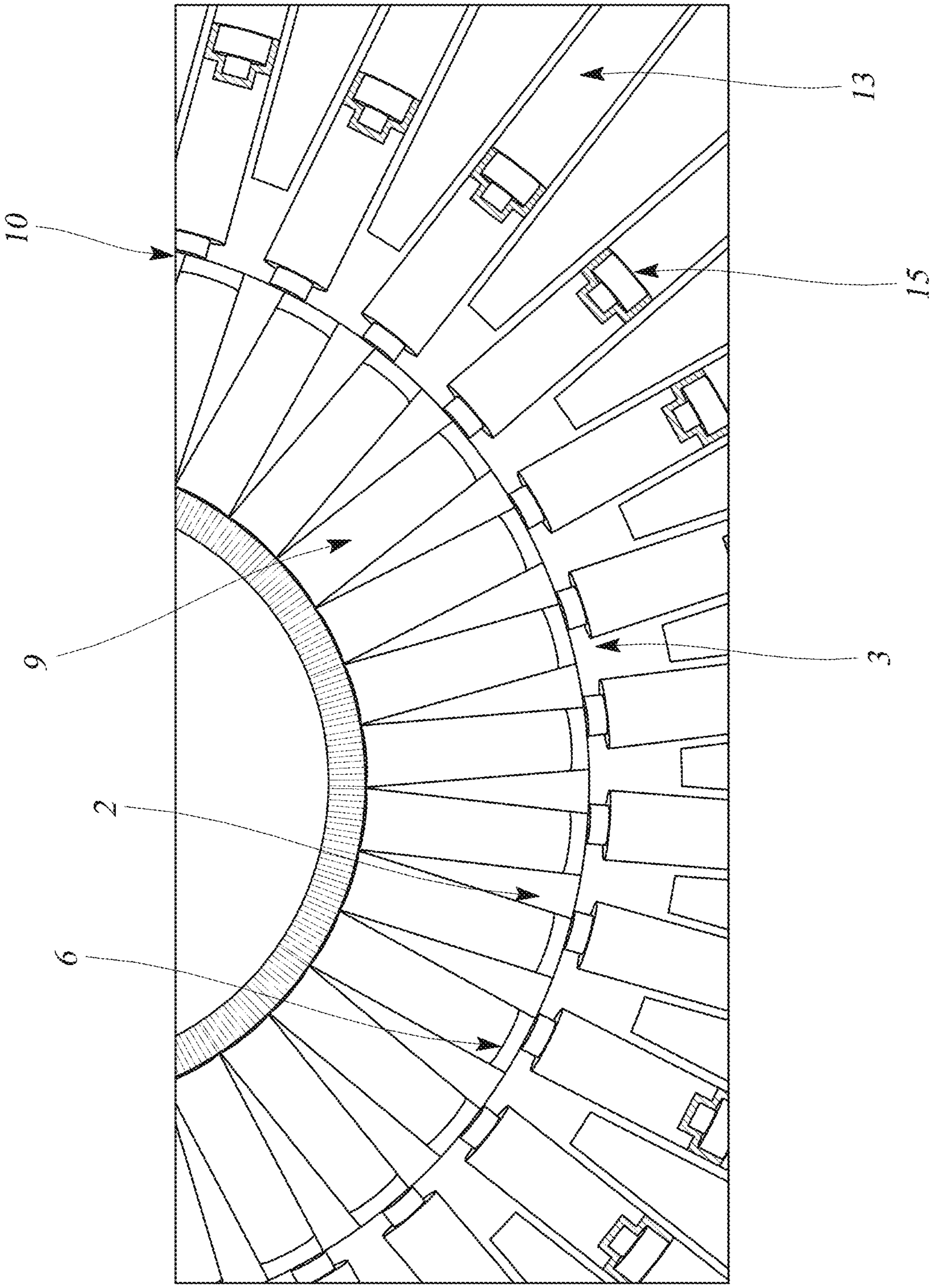
FIG. 4 is a partial cross-sectional plan view of the plasma compression system having compression drivers according to the first embodiment, showing the orientation of the compression drivers on the vessel and the orientation of the implosion drivers in the rotating core.

Referring particularly to FIG. 4, the compression drivers 4 are positioned radially on the outer surface of the vessel wall 3 and the implosion drivers consisting of pusher pistons 6 within pusher bores 9 extend radially within the rotating core 2. The driver pistons 15 are shown midway along their inward travel within the driver bore 13 toward the rotating core 2. In alternative embodiments the compression drivers 4 and implosion drivers can be positioned non-radially and non-perpendicularly to the vessel 3 and rotating core 2, so long as the compression drivers 4 can still compress the compression fluid and generate a pressure pulse to actuate the implosion drivers 5.

Referring particularly to FIGS. 5A, 5B, 5C, and 5D, and 5E, a compression operation involves rapidly moving each driver piston 15 towards the vessel wall port 12 thereby compressing the compression fluid in the annular gap 10 and creating a pressure pulse against the pusher pistons 6, which then move inwards within the pusher bores 9 and pushes the liquid medium inwards through the rotating core 2 and into the cavity 28. Four basic stages of the compression operation are shown, wherein: Stage 1 is the initial (start) stage before the compression driver is triggered. In this stage the accumulator 17 is fully charged, the valve 16 is closed and the pistons 15, 6 are in their initial positions (FIG. 5A).

In Stage 2 (FIGS. 5B and C), the driver valve 16 is opened and the driver fluid in the accumulator 17 passes through the driver valve 16 and enters the driver bore 13 behind the driver piston 15, causing the driver piston 15 to accelerate along the driver bore 13 toward the rotating core 2. During Stage 2, the potential energy stored as a high pressure of the fluid in the accumulator 17 is converted into a kinetic energy in the motion of the driver piston 15 and the pressure of the compression fluid contained in the driver bore 13 rises. In Stage 3 (see FIG. 5D) the driver piston 15 nears the rotating core 2, and the compressible fluid pressure in the annular gap 10 rises sharply as it absorbs the kinetic energy of the driver piston 15, such that the compression fluid pressure exceeds the pressure of the liquid medium in the pusher bores 9 holding the pusher pistons 6 in place. In Stage 4 (see FIG. 5E) the pusher pistons 6 accelerates rapidly, pushing the liquid medium out of the pusher bores 9 and the rotating core 2.

Figure 7A:
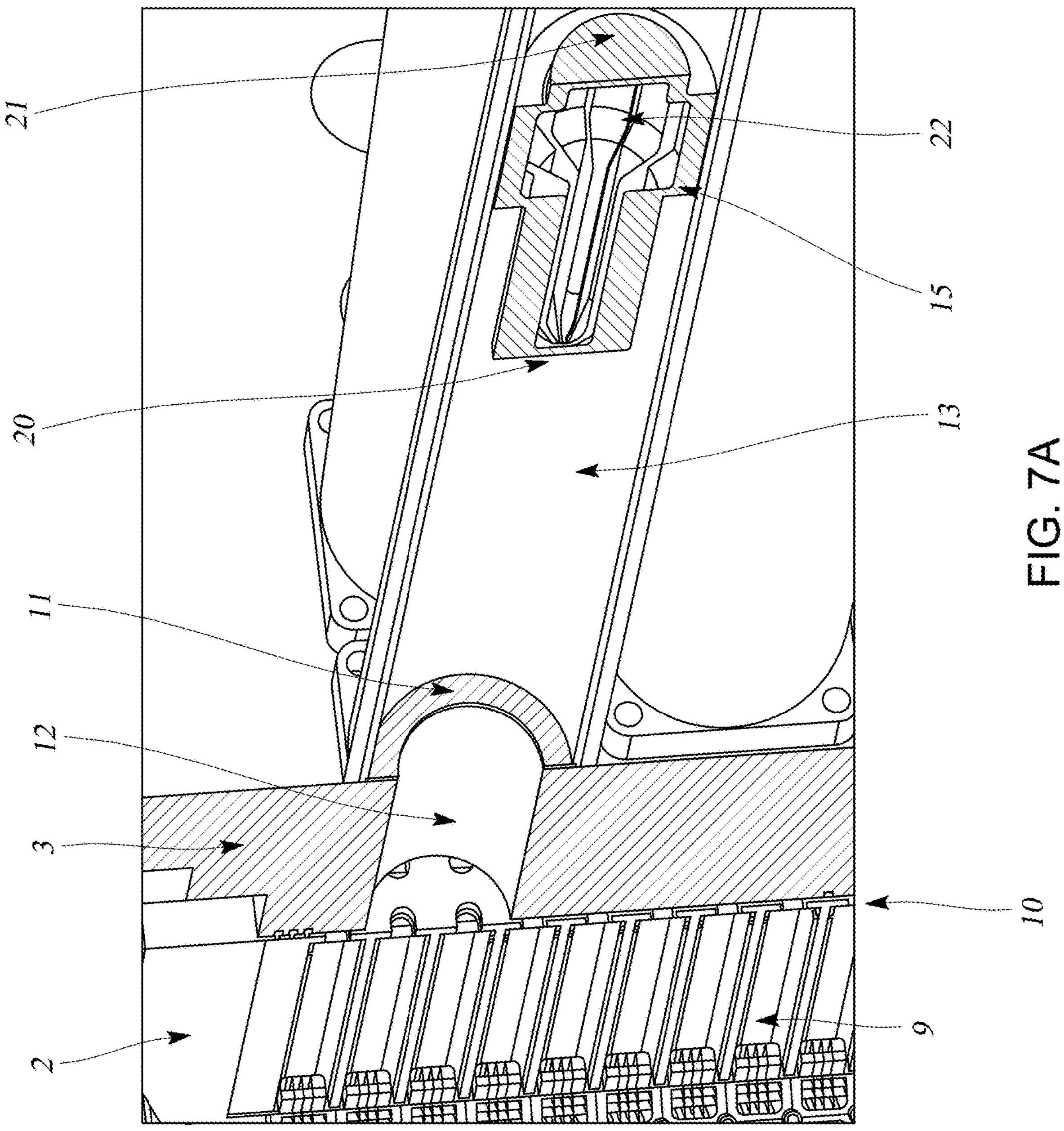
FIG. 7A is a partial cross-sectional perspective view of the driver piston and multiple pusher pistons of the first embodiment of the compression driver, in proximity to the vessel wall.
Figure 7B:
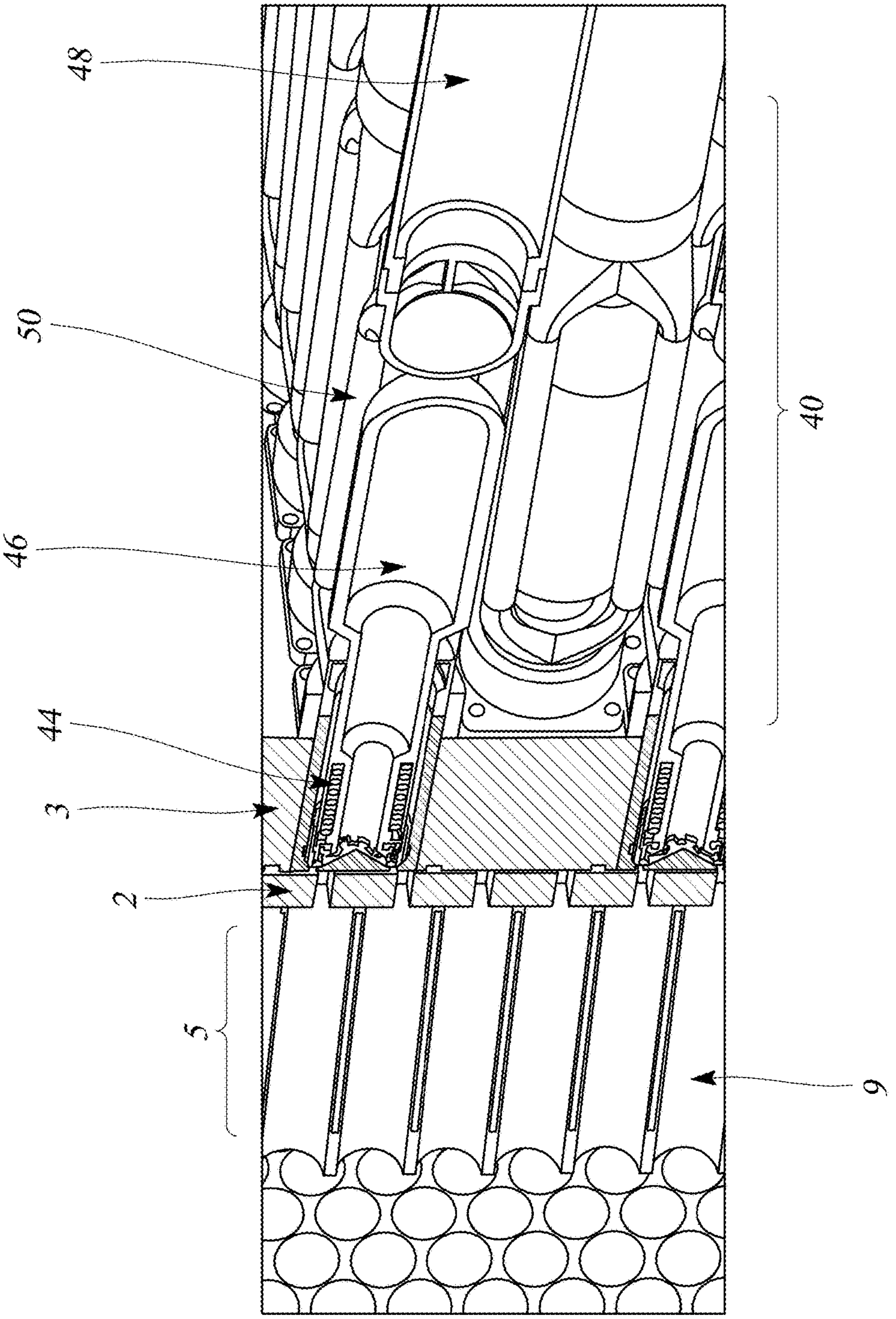
FIG. 7B is a partial cross-sectional perspective view of the multiple accumulators and drive valves of the second embodiment of the compression driver and multiple push pistons in proximity to the vessel wall.

Referring to FIG. 7A, an annular face surface 11 is provided at the distal end of the driver bore 13 and the vessel wall port 12. During the compression operation, the compression fluid applies an inward force on the annular face surface 11; in other words, the annular face surface 11 applies an inward force on the vessel 3 and serves as a pressure balancing lip such that the pressure pulse generated by the driver piston 15 will offset or reduce the pressure pulse generated by the pusher pistons pushing on the liquid medium in the pusher bore 16 and thus will reduce (minimize) the stress imparted by the compression drivers 4 on the vessel 3. Additionally, the driver piston has a distal end 20 designed to cooperate with the annular face surface 11 to define an annular channel when the driver piston 15 reaches the vessel wall 3, wherein the compression fluid is highly compressed. The high pressure of the compression fluid in the annular channel serves to slow down the driver piston 15 and prevent the impact with the annular face surface 41 and the vessel wall 3.

More particularly, the driver piston 15 comprises a cylindrical first section with a distal end 20 and a diameter corresponding to the diameter of the vessel wall port 12, and a cylindrical second section with a proximal end 21 and a diameter corresponding to the diameter of the driver bore 13; the two sections are connected by an annular ledge. The annular rim of the first section and the annular ledge along with the annular face surface 11 form the aforementioned annular channel. Persons skilled in the art would understand that the driver piston 15 can have other shapes in alternative embodiments. A number of gussets 22 are formed inside the periphery of the driver piston 15 to further reduce weight while maintaining strength and the stiffness.

Referring now to FIGS. 2B, 6A-D, 7B and 8B, and according to a second embodiment, the plasma compression system 1 comprises compression drivers 40 that use pressurized gas instead of pistons to deliver a pressure pulse into the annular gap 10 ("single stage compression driver embodiment"). The compression driver 40 as shown in these Figures has a generally cylindrical valve housing 42 fixedly mounted at one end to an outer surface of the vessel wall 3, and contains a drive valve 44 that is in fluid communication with a vessel wall opening 3 and an accumulator 46. The accumulator 46 is a pressure vessel that contains a highly pressurized compression fluid. The initial and intermediate pressures of the compressible fluid in the accumulator 46 and the timing of the release of the compressible fluid through the drive valve 44 contribute to achieving the synchronized, shaped collapse of the liquid liner. In one embodiment, the pressure of the compression fluid can be fine-tuned prior to the compression shot by using a heating element 53 disposed within the accumulator 46 to heat the compression fluid. In another implementation, the pressure of the compression fluid can be fine-tuned during the compression shot by heating the compression fluid by means of an electric arc generated across two electrodes 19 positioned within the accumulator 46. The compression fluid can be any fluid that can be compressed and can in one implementation be a gas, such as helium. In another implementation, the compression fluid can be a mixture of a gas and a liquid medium, such as steam.

The drive valve 44 can be a conical seat shut off valve like the type disclosed in U.S. Pat. No. 8,336,849; however persons skilled in the art would appreciate that other suitable valve designs can also be used. The drive valve 44 is communicative with the controller 32 and its computer readable memory has encoded thereon instructions executable by the its processor to open the drive valve 44 to discharge the compression gas into the annular gap in a compression operation.

A pressure relief tank 48 is provided to receive the compression fluid from the annular gap after the pressure pulse has actuated the implosion drivers 5. The pressure relief tank 48 is fluidly coupled to the vessel wall opening 3 by a compression fluid return conduit 50, which comprises an annular passage extending lengthwise between the vessel wall opening 3 and the accumulator pressure vessel 46, and multiple manifolds that extend lengthwise along the outside of the accumulator pressure vessel 46 to openings at the distal end of the pressure relief tank 48. A rebound valve 52 is located at the distal end of the fluid return conduit 50 and is communicative with the controller 32 which is programmed to open the rebound valve 52 to allow the relief tank 48 to receive the compression fluid.

Figure 6A:
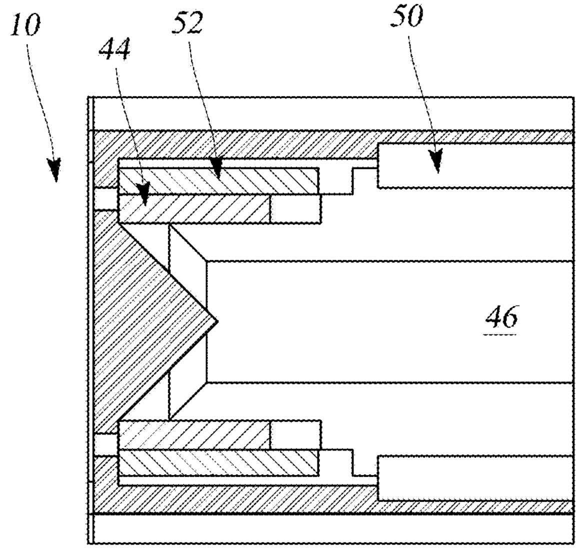
Figure 6B:
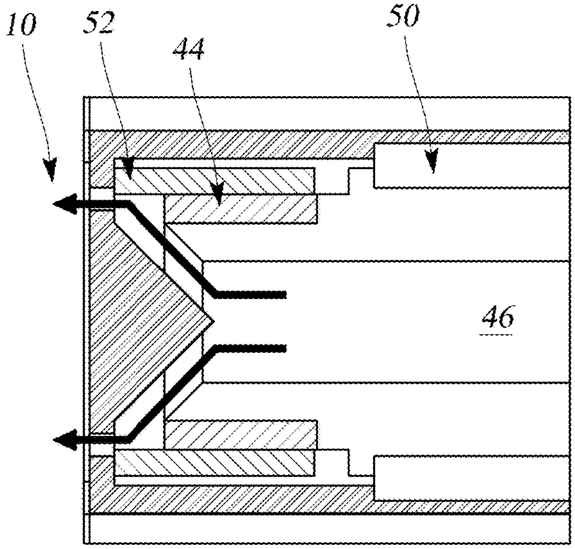
Figure 6C:
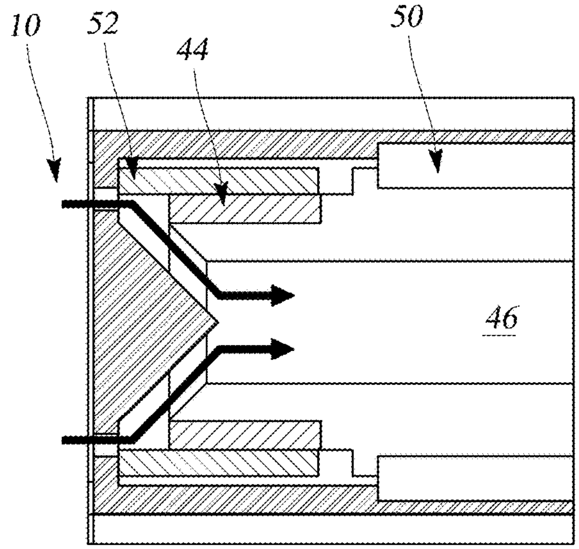
Figure 6D:
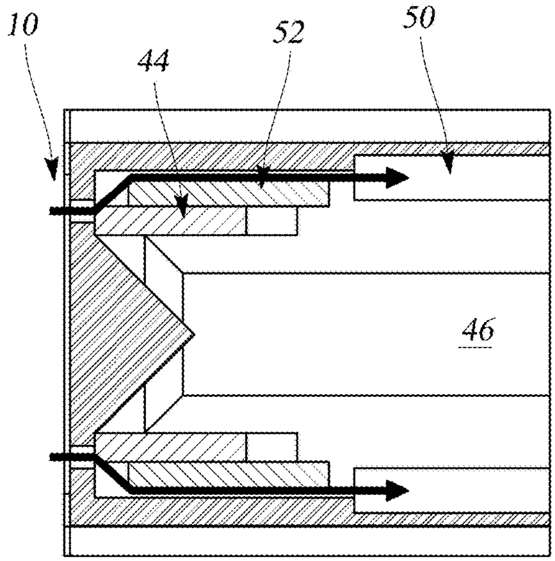

Referring to FIGS. 6A-6D, the controller 32 controls the opening and closing of the drive valve 44 and rebound valve 52 over four phases of the compression shot. As shown in FIG. 6A and during a pre-shot phase, both the drive valve 44 and rebound valve 52 are closed and the accumulator pressure vessel 46 is filled with high pressure compression fluid. As shown in FIG. 6B, and during a compression phase, the controller 32 opens the drive valve 44 and the compression gas is discharged directly into the annular gap 10, as shown by the arrows. This creates a rapid pulse of pressure in the annular gap 10 and provides the motive force to accelerate the pusher pistons 6 which in turn collapse the liquid liner and compress the plasma target. As shown in FIG. 6C, and during a rebound recovery phase, the controller 32 keeps the drive valve 44 open and the rebound valve 52 closed, and the liquid liner rebounds and some of the compression fluid flows back into the accumulator pressure vessel 46 as shown by the arrows. As shown in FIG. 6D and during an energy dissipation phase, the controller 32 closes the drive valve 44 and opens the rebound valve 52, and the rest of the compression fluid flows from the annular gap 10, past the rebound valve 52, through the compression fluid return conduit 50, and into the relief tank 48. This process brings the pressure in the annular gap 10 back down to a level which allows the rest of the plasma compression system to reset for the next compression shot, and serves to recapture a portion of the energy returned by the rebound of the liquid line back into the rotating core and pusher bores. Once the pressures have equalized, the controller 32 closes the rebound valve 52 to maintain system reset status and begins preparations for the next compression shot.

Alternatively (not shown), the opening and closing of the valves during the four phases of the compression shot can be provided by a mechanical system instead of the controller. The mechanical system comprises mechanical timing devices known in the art, such as a spring-closed poppet or a cam-shaft acting upon valve actuators.

In the illustrated embodiment, each compression driver 40 comprises its own accumulator 46; however in alternative embodiments, multiple compression drivers 40 can share a single accumulator, for example, one accumulator can be provided for each layer of compression drivers (not shown), or a single accumulator can be provided for all the compression drivers 40 (not shown).

Figure 8A:
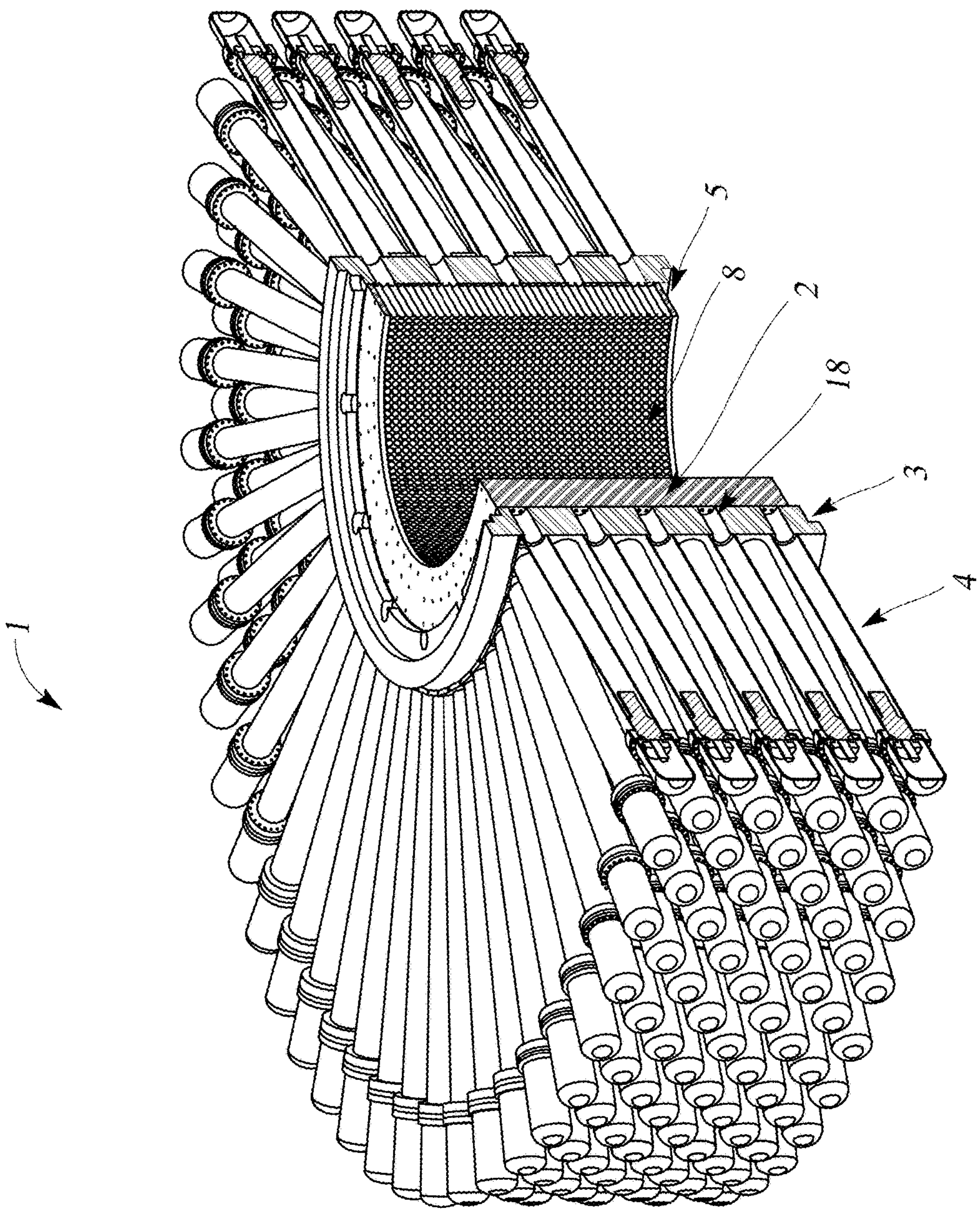
Figure 8B:
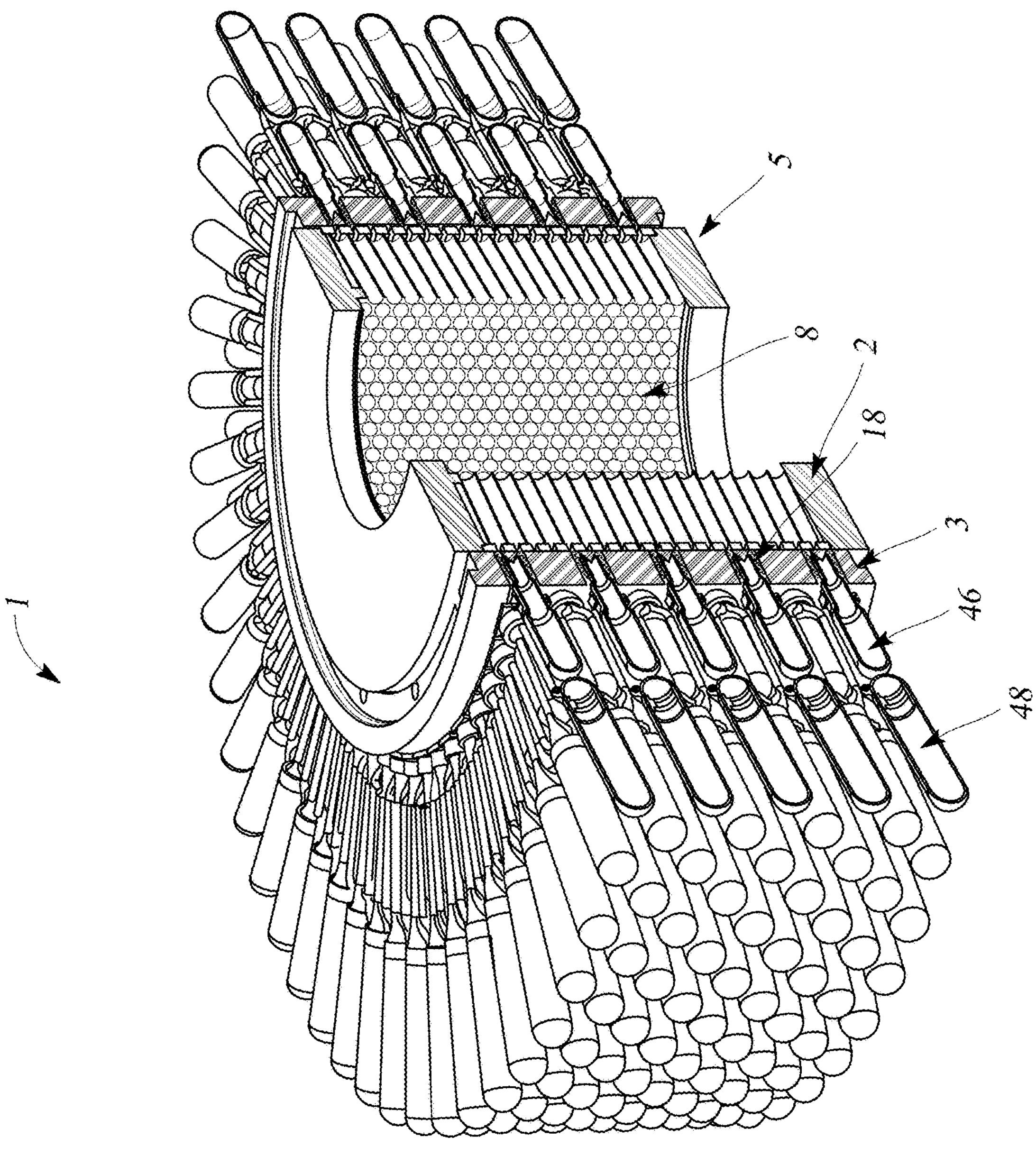
FIG. 8B shows the second embodiment of the compression drivers.

Referring to FIGS. 8A and 8B, the compression drivers 4 are arranged radially around the vessel 3 in multiple layers stacked axially relative to the rotational axis of the rotating core 2. In the illustrated embodiment, there are nine compression driver layers each defining a controllable pressure zone; however, the plasma compression system 1 can have a different number of compression driver layers according to alternative embodiments. For example, a prototype plasma compression system as shown in FIGS. 8 and 9 feature seven compression driver layers defining seven pressure zones.

Figure 9:
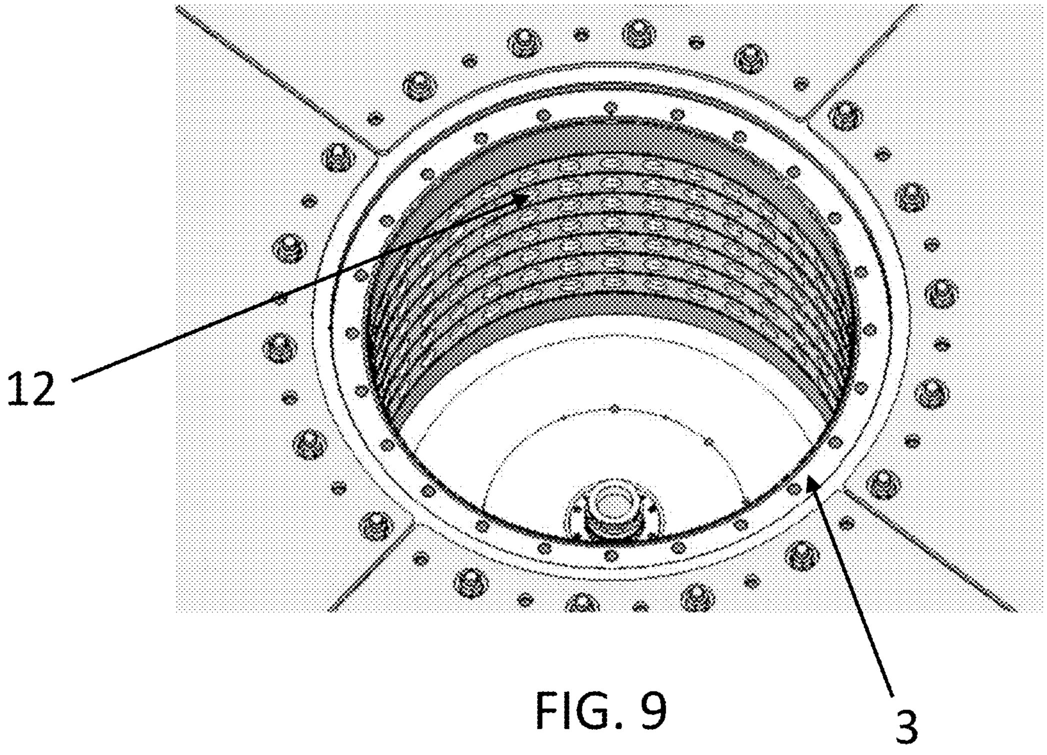
FIG. 9 is a photograph of a portion of a prototype embodiment of the plasma compression system, showing the vessel with vertically stacked layers of ports.
Figure 10:
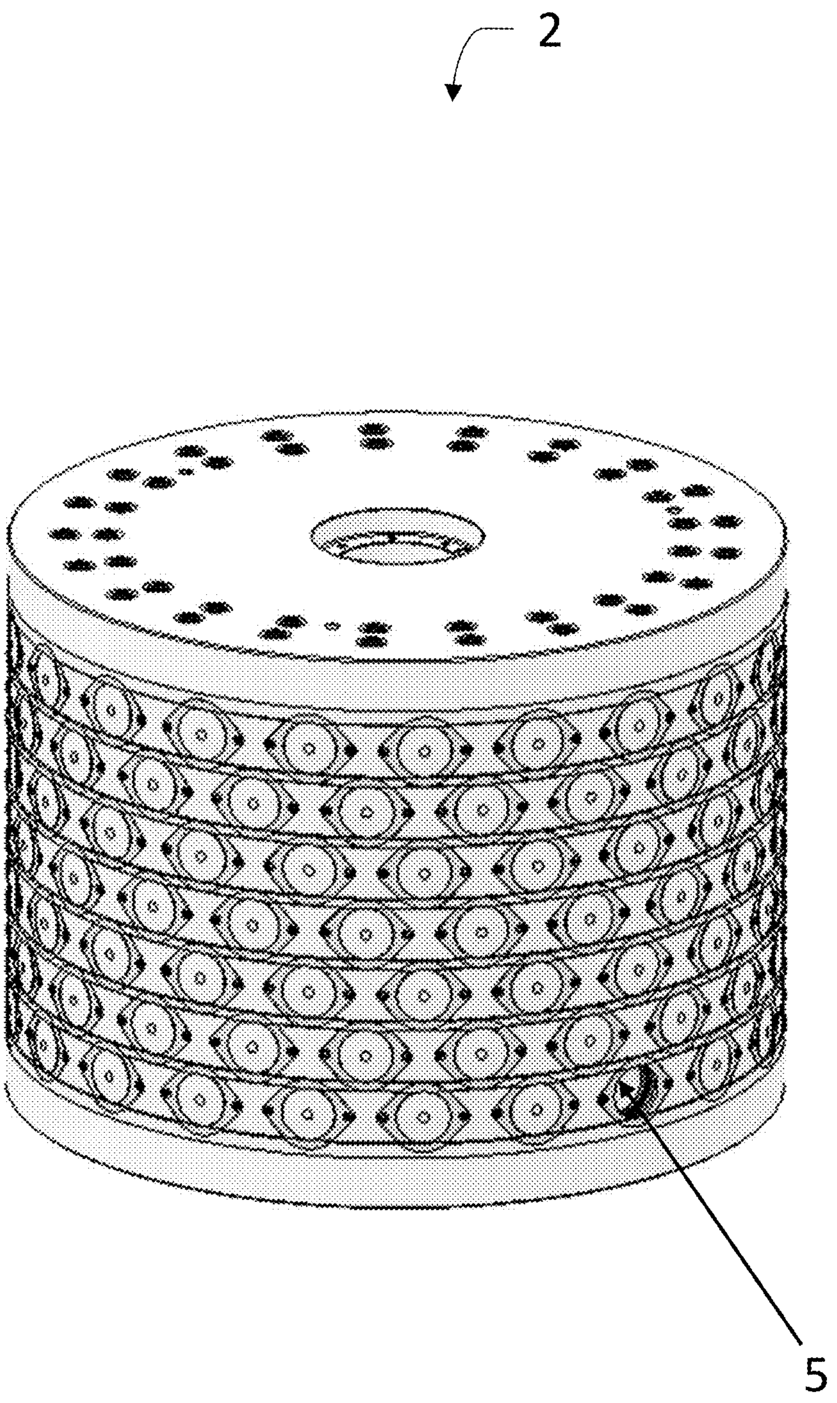
FIG. 10 is a photograph of a rotating core of the prototype embodiment, showing vertically stacked layers of implosion driver pusher bores.

As can be most clearly seen in FIG. 9, the configuration of axially stacked compression driver layers result in the associated ports 12 in the vessel wall 3 to also be arranged in multiple axially stacked layers. The implosion drivers 5 in the rotating core 2 are also arranged in multiple axially stacked layers; in the prototype embodiment shown in FIGS. 9 and 10, there are the same number of implosion and compression driver layers (seven) such that each implosion driver layer is paired with a corresponding compression driver layer to define a pressure zone. Alternatively, there can be a different ratio of implosion driver layers to compression driver layers in a pressure zone; for example, in the embodiment shown in FIGS. 1-7, each pressure zone comprises four implosion driver layers and one compression driver layer.

Optional annular sealing rings (not shown) are mounted to the vessel inner wall between each compression driver layer. These sealing rings extend into the annular gap 10 and serve to partly or completely confine the compression fluid in each pressure zone. Alternatively, the annular sealing rings can be mounted to the rotating core outer surface and extend into the annular gap.

Referring now to FIGS. 11 to 14, the controller 32 is programmed with a compression operation program that controls the operation of the compression drivers in each pressure zone to generate an individual pressure pulse having a specified pressure pulse trajectory, such that the individual pressure pulses together form a combined pressure pulse with a shaped pressure pulse trajectory that varies along the axial direction, i.e. parallel to the rotating core rotational axis. Throughout the disclosure where a controller is referenced it may include one or more controllers in communication with each other through one or more networks or communication mediums. Each controller generally comprises one or more processors and one or more computer readable mediums in communication with each other through one or more networks or communication mediums. The one or more processors may comprise any suitable processing device known in the art, such as, for example, application specific circuits, programmable logic controllers, field programmable gate arrays, microcontrollers, microprocessors, virtual machines, and electronic circuits. The one or more computer readable mediums may comprise any suitable memory devices known in the art, such as, for example, random access memory, flash memory, read only memory, hard disc drives, optical drives and optical drive media, or flash drives. In addition, where a network is referenced it may include one or more suitable networks known in the art, such as, for example, local area networks, wide area networks, intranets, and the Internet. Further, where a communication to a device or a direction of a device is referenced it may be communicated over any suitable electronic communication medium and in any suitable format known to in the art, such as, for example, wired or wireless mediums, compressed or uncompressed formats, encrypted or unencrypted formats.

Figure 12:
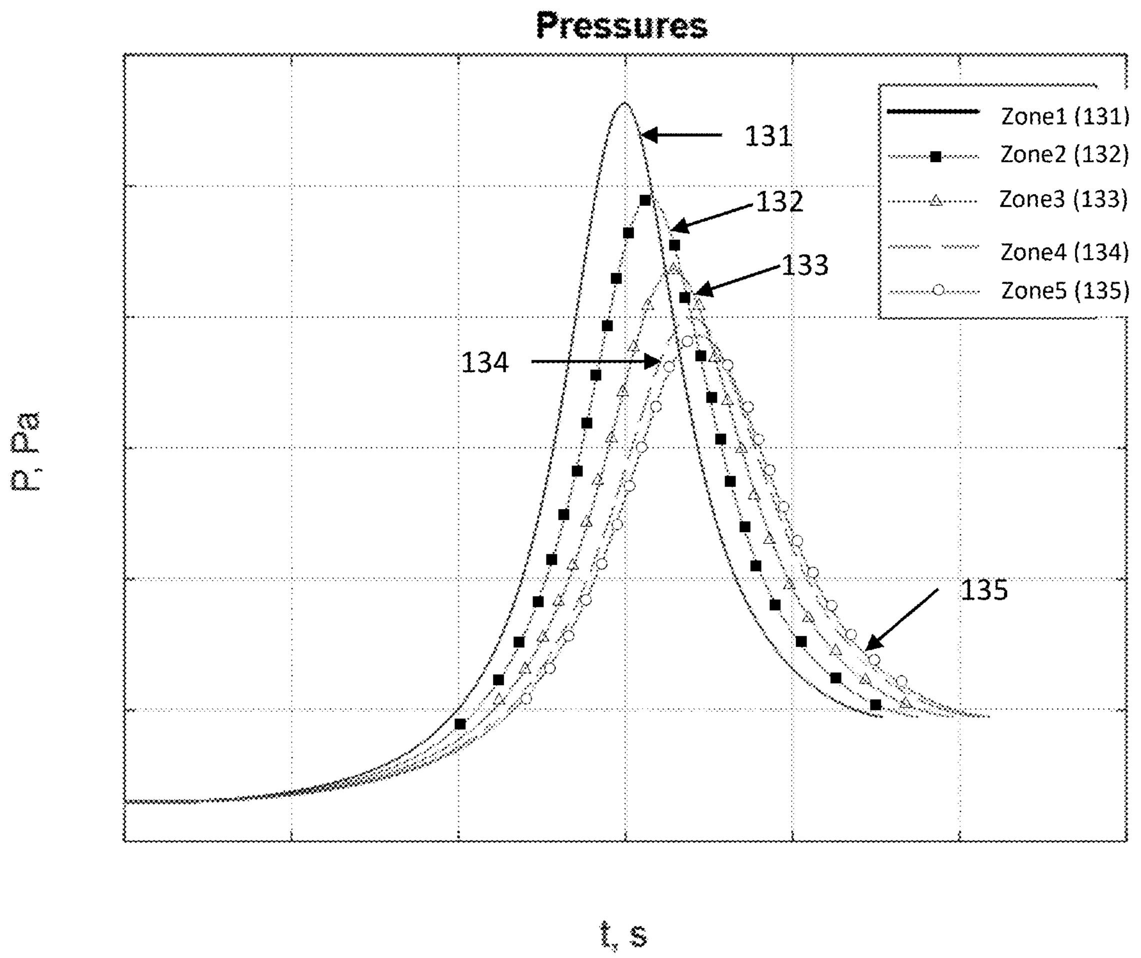
FIG. 12 is pressure-time graph of pressure pulses generated by five compression driver layers.
Figure 13A:
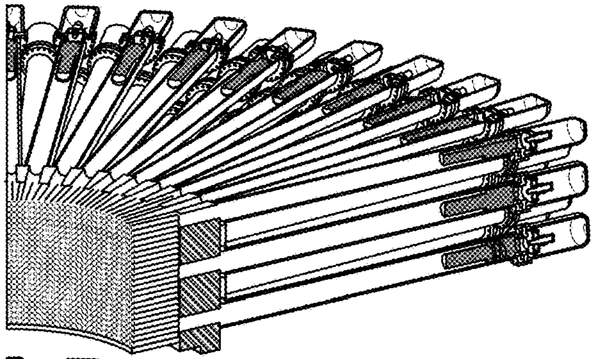
FIGS. 13A-13E are partial cross-sectional perspective views of the two-stage compression driver embodiment showing three of the five compression driver layers in operation to generate the pressure pulses shown in FIGS. 14A-14D.
Figure 13B:
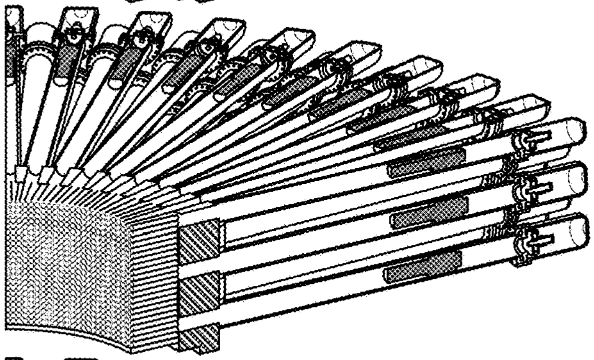
Figure 13C:
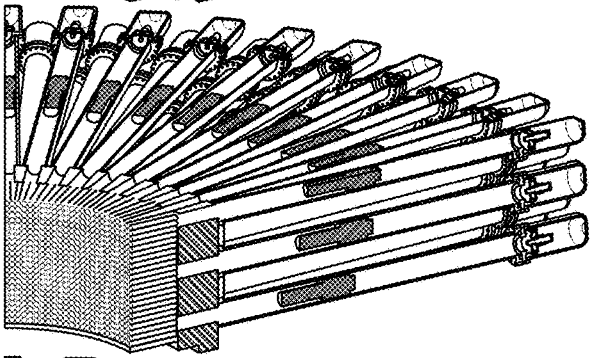
Figure 13D:
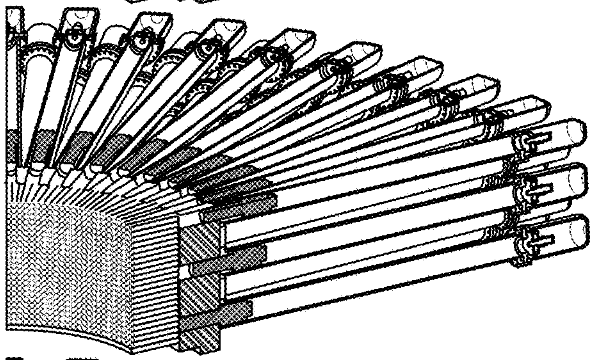
Figure 13E:
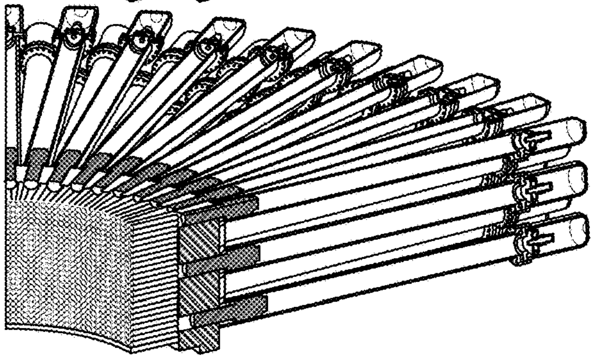

In both embodiments and referring to FIG. 12, the desired pressure pulse trajectory is symmetrical about an equator of the vessel 3. Therefore, the controller 32 is programmed to separately control the compression driver layer at the vessel equator ("equatorial compression driver layer") and pairs of compression driver layers on each side the equatorial compression driver layer. In other words, the controller 32 operates the nine compression driver layers in five separately controllable pressure zones, namely: the top and bottom compression driver layers form pressure zone 1 (131), the compression layer at the vessel equator forms pressure zone 5 (135), and the three pairs of compression layers in between pressure zones 1 (131) and 5 (135) form pressure zones 2 to 4 (132, 133, 134) respectively. The controller 32 operates the compression drivers 4 in pressure zone 1 (131) to create an individual pressure pulse ("individual pressure pulse 1") with the highest amplitude and/or earliest peak, with individual pressure pulses having progressively decreasing pressure pulse amplitudes and/or later peaks from zones 2 to 5 (individual pressure pulses 2, 3 etc.), such that the combined pressure pulse has a generally symmetrically curved pressure profile trajectory as shown in FIGS. 14A to 14E.

Referring to FIGS. 12 and 13A-13E and using the dual-stage compression driver embodiment as an example, the controller 32 operates the compression drivers 4 to control the individual pressure pulse trajectory in each of pressure zones 1-5 by controlling the timing and pressure of the driver gas discharged by the accumulator 17 fluidly coupled to each compression driver layer. In this embodiment, one or more of the timing, lift (opening size) and duration of the valve 16 can be controlled to control the individual pressure pulse trajectory; additionally and/or alternatively, the individual pressure pulse trajectory can also be varied by varying the pressure of the driver fluid between accumulators 17 in different pressure zones. FIGS. 13A-13E only shows three compression driver layers for the sake of clarity, and it can be seen that the controller 32 opens the valve 16 of the accumulator 17 of the bottom compression driver layer the earliest and with the largest opening and/or longest duration to create an individual pressure pulse that has the highest amplitude and the earliest peak, and opens the valve 16 of the accumulator 17 of the top compression driver layer the latest and with the smallest opening and/or the shortest duration, to create an individual pressure pulse having the lowest amplitude and the latest peak. Alternatively and/or additionally, the controller 32 can set the pressure of the driver fluid in the accumulator 17, wherein the bottom compression driver layer can have the highest driver fluid pressure to produce a pressure pulse with the highest amplitude. Alternatively, and/or additionally, the controller 32 can control the valve closing timing, lift and/or duration to shape the individual pressure pulse trajectory. When determining the valve control parameters to shape a particular pressure pulse trajectory, consideration is given to the inertia in the pusher piston, which is actually the combined inertia in both the pusher piston and the liquid metal in the pusher bore.

The pressure profile of the individual pressure pulse in each pressure zone can be fine-tuned by controllably injecting or venting driver fluid into and out of the driver bores during the compression operation. For example and with respect to the second embodiment of the compression drivers, the pressure profile of the driver piston 15 or each compression driver 4 can be adjusted by venting driver fluid from the driver bore 13 via ports 18 in the driver bore 13 behind the driver piston 15; these ports 18 have controllable valves similar to the driver fluid valve 16 that are controllable by the controller 32. The pressure profile of the driver piston 15 can also be controlled by controlling the pressure of the compression fluid in front (downstream) of the driver piston 15. Ports 18 (see FIG. 2A) in the wall of the compression driver 4 between the driver pistons and the vessel wall 3 can be controlled by the controller 32 to inject or vent the compression fluid. In addition, additional compressible fluid can be injected near the proximal end of the driver bore 13 to slow down the driver piston 15 to prevent impact with vessel 3. The length of the driver bore 13 can be designed to be long enough so that the trajectory of the driver piston 15 can be tuned by changing the pressure of the driver fluid and/or the pressure of the compression fluid. The controller 32 can communicate with a number of sensors (not shown) along the driver more to measure the position of the driver piston 15 during the compression operation.

In another implementation of the two-stage compression driver embodiment, the controller 32 is communicative with a pair of electrodes 19 positioned at the distal end of the driver bore 13, between the driver piston 15 and the rotating core 2 to generate an electrical arc which heats the compression fluid in the driver bore 13. The controller 32 is programmed to calculate an adjustment to the timing and strength of the electrical arc to controllably heat the compression fluid, based on whether an individual pressure pulse in a pressure zone needs a "boost" in pressure or needs to fire sooner.

In another implementation of the single-stage compression driver embodiment, the controller 32 is communicative with a heating element 53 positioned within the accumulator 46 to generate heat which heats the compression fluid in the accumulator 46. The controller 32 is programmed to calculate an adjustment to the initial temperature of the compressible fluid, which in turn controllably adjust the initial pressure of the compressible fluid prior to the compression shot, according to known Gas Law. Temperature and pressures of the compressible fluid in the accumulator 46 are tuned based on whether an individual pressure pulse in a pressure zone needs an adjustment in initial pressure.

In another implementation of the single-stage compression driver embodiment, the controller 32 is communicative with a pair of electrodes 19 positioned within the accumulator 46 to generate an electrical arc which heats the compression fluid in the accumulator 46. The controller 32 is programmed to calculate an adjustment to the timing and strength of the electrical arc to controllably heat the compression fluid, based on whether an individual pressure pulse in a pressure zone needs a "boost" in pressure or needs to fire sooner.

Figure 11A:
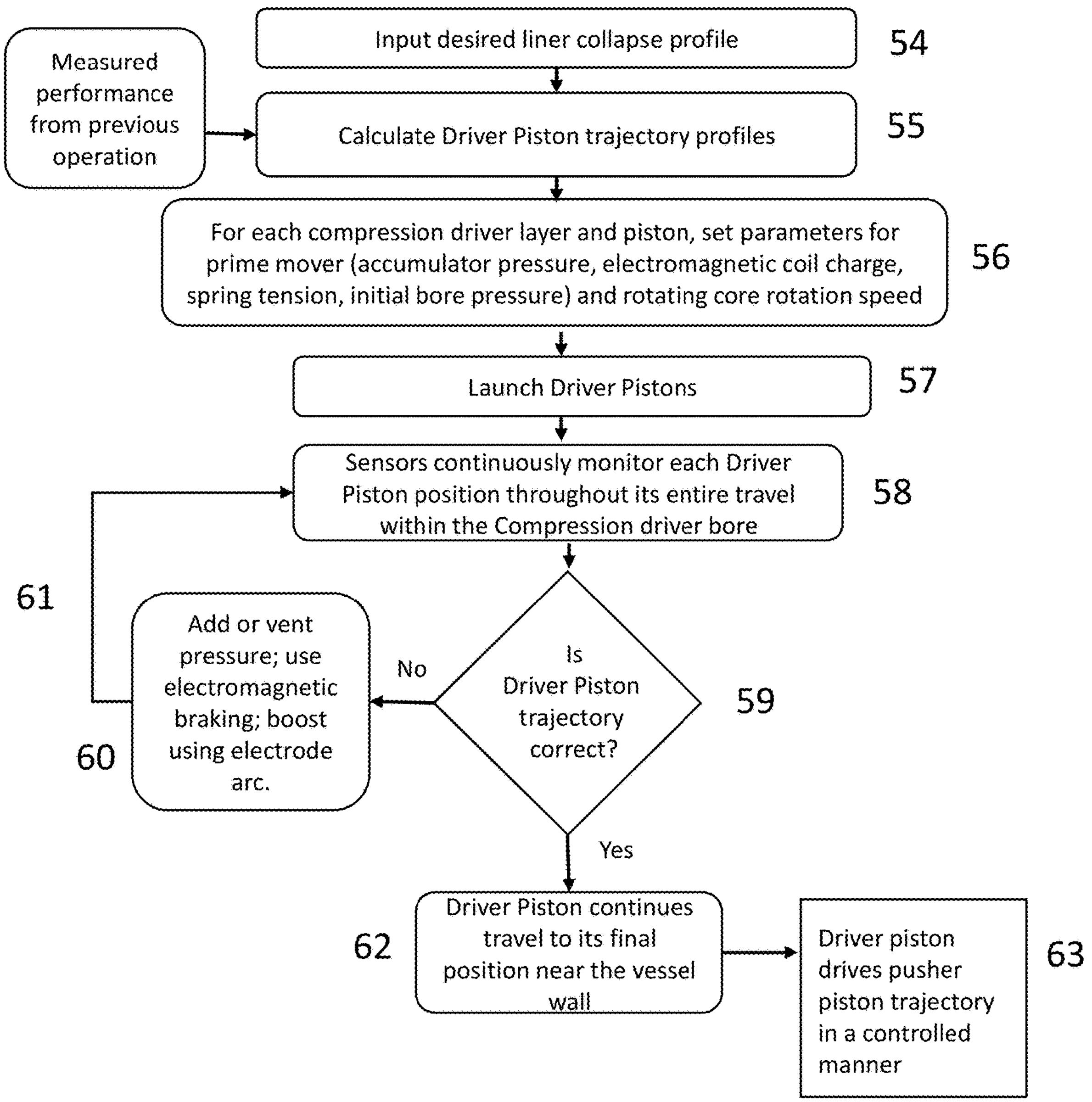
FIG. 11A is a flow chart showing a compression operation program encoded in a control system for the plasma compression system, using the first embodiment of the compression driver.

Referring now to FIG. 11A, the controller 32 memory has encoded thereon a compression program operation that controls the compression drivers 4 of the dual-stage compression driver embodiment, to generate a combined pressure pulse having a desired pressure pulse trajectory. The controller 32 receives inputs from standard machine parameters required to achieve a specific shape and timing of the liquid liner collapse. In the illustrated embodiment, the desired pressure pulse trajectory has a spheroid shape, requiring the early collapse of the open ends of the cavity 28. The controller 32 requires the compression drivers 4 nearest each open end of the cavity 28 to operate prior to those compression drivers 4 near the equator of the liquid liner 27. The controller 32 establishes the desired liner collapse profile (step 54), and calculates the required piston trajectory profiles and delays for each compression driver layer necessary to achieve the required shape of liner collapse and desired plasma compression (step 55).

Once the desired trajectory profiles for each compression driver layer are calculated, the controller sets the parameters including the rotating core rotation speed, the prime mover settings, and piston launch sequence timing in each compression driver layer (Step 56) The parameters for the plasma compression system will depend on the design and size of a particular system, however typical examples of initial parameters that can be controlled by the controller 32 include the initial charge of high pressure fluid in the accumulator 17, the charge to be applied to the coils of an electromagnetic drive system (not shown), the tension applied to a mechanical spring (not shown), the initial driver bore pressure, and the rotation speed of the rotating core 2. An example of a standard parameter is the force of gravity upon the rotating liquid liner 27, relative to the centripetal force generated by its rotation within the rotating core 2. The gravity force vector causes the liquid liner to be slightly thicker at the bottom of its cavity than at its top. This difference in shape perturbs the symmetrical cylindrical shape of the liquid liner cavity. The controller 32 accounts for this asymmetry by launching the layers of driver pistons positioned near the top of the cavity 28 slightly sooner than those layers positioned near the bottom of the cavity 28, thereby achieving symmetrical collapse. The standard machine parameters may be modified by the historical operational parameters for the system, and each compression driver. Historical operational parameters may include for example the differences in friction and wear over time for each compression driver. For example, individual pistons or bores having higher friction due to wear may require a higher pressure gas charge in the accumulator, to overcome the higher friction.

After the controller 32 evaluates the liner collapse shape requirements and modifies the standard machine parameters according to the historical operational parameters, the controller 32 launches the driver pistons (step 57). During the travel of the driver pistons along the bore, sensors continuously monitor the position and velocity of each of the pistons throughout their entire travel within the compression driver bore (step 58). A multitude of sensors transmit position and velocity information to the controller 32, which evaluates if the trajectory profile is correct for each driver piston in the system (step 59). If not correct for a given driver piston, the controller 32 can fine tune the driver piston's trajectory profile by injecting or venting driver or compression fluid via the ports 18, and/or boost compression fluid pressure by heating via electrodes 19, or by electromagnetic braking when the compression driver is so equipped (step 60). A feedback loop is established to correct the trajectory profile of the driver piston (step 61). When no further correction is required, the controller 32 allows the driver pistons in each compression driver layer to continue travel to its final position near the vessel wall, to generate the individual pressure pulse (step 62), which combined will drive the pusher pistons in a controlled manner according to a trajectory that will collapse the liquid liner and compress the plasma in the cavity 28 (step 63).

Figure 11B:
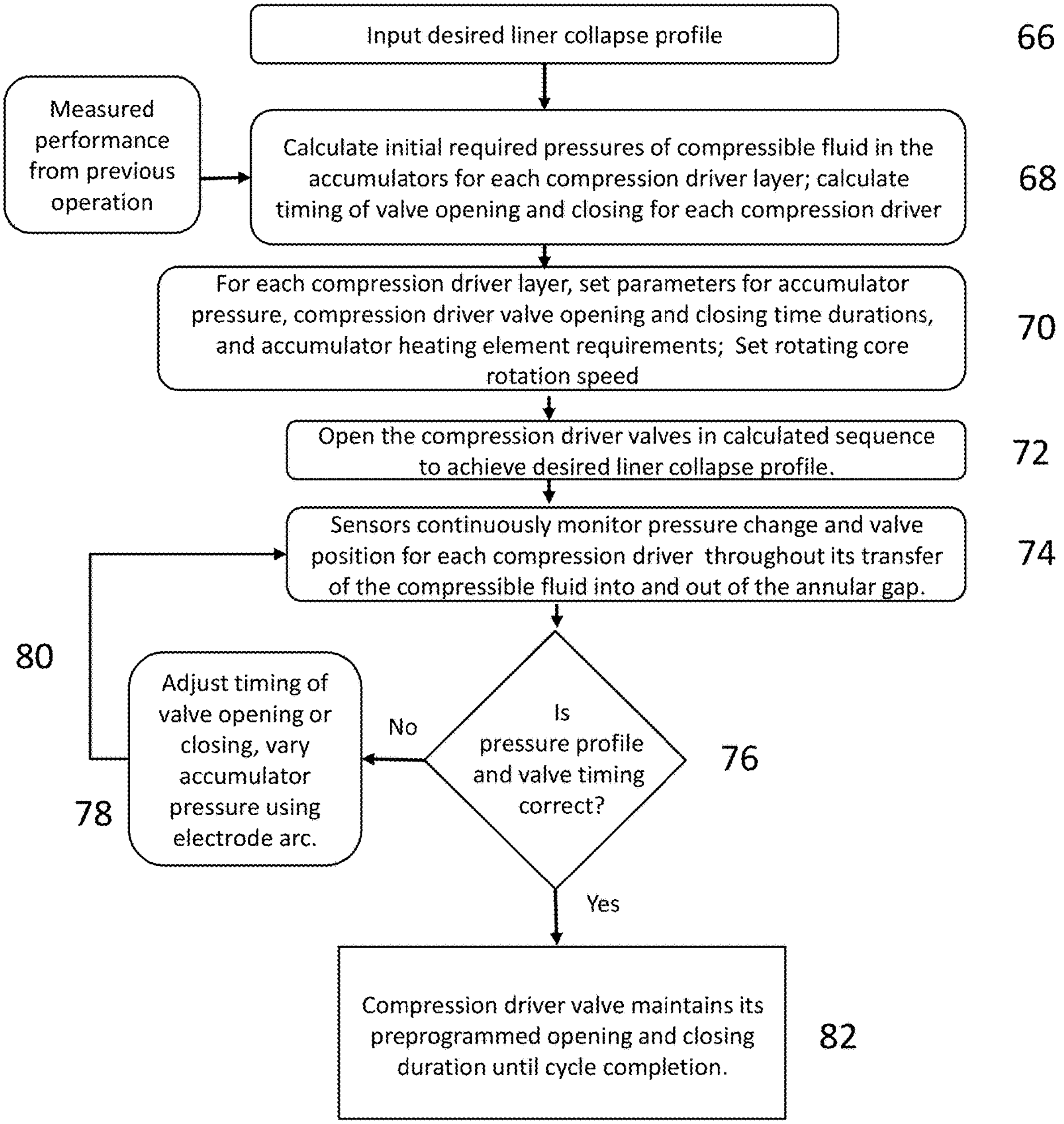
FIG. 11B is a flow chart showing a compression operation program encoded in a control system for the plasma compression system, using the second embodiment of the compression driver.

Referring now to FIG. 11B, the controller 32 memory has encoded thereon a compression program operation that controls the compression drivers 40 of the single-stage compression driver embodiment, to generate a combined pressure pulse having a desired pressure pulse trajectory. The controller 32 receives inputs from standard machine parameters required to achieve a specific shape and timing of the liquid liner collapse. In the illustrated embodiment, the desired pressure pulse trajectory has a spheroid shape, requiring the early collapse of the open ends of the cavity 28. The controller 32 requires the compression drivers 40 nearest each open end of the cavity 28 to operate prior to those compression drivers 40 near the equator of the liquid liner 27. The controller 32 establishes the desired liner collapse profile (step 66), calculates the initial required pressures of compressible fluid in the accumulators 46 for each compression driver layer, and calculates the timing of valve opening and closing for each compression layer (step 68).

Once the desired pressure pulse trajectory profiles for each compression driver layer are calculated, the controller 32 sets the parameters for accumulator pressure, compression driver valve opening and closing time sequences and durations, and accumulator heating element requirements for each compression driver layer; the controller 32 also sets the rotating core rotation speed (step 70).

The controller 32 then opens the compression driver valves 44 of each compressive driver layer in the calculated sequence to achieve the desired liner collapse profile (step 72). Sensors continuously monitor pressure change and valve position for each compression driver 40 throughout its transfer of the compressible fluid into and out of the annular gap (step 74).

The controller 32 evaluates if the pressure profile and valve timing is correct for each pressure pulse in the system (step 76). If not correct for a given compression driver layer, the controller 32 can fine tune the pressure pulse trajectory profile by adjusting the timing of the valve opening, and/or varying accumulator pressure by heating using the electrodes 19, or by injecting or venting the accumulator pressure (step 78). A feedback loop is established to correct the pressure pulse trajectory profile of the compression layer (step 80). When no further correction is required, the controller 32 maintains the compression driver valve preprogrammed opening and closing sequences and durations to generate the individual pressure pulse, which combined with other pressure pulses of other compression layers will drive the pusher pistons in a controlled manner according to a trajectory that will collapse the liquid liner and compress the plasma in the cavity 28 (step 82).

Figure 5E:
Figure 14A:
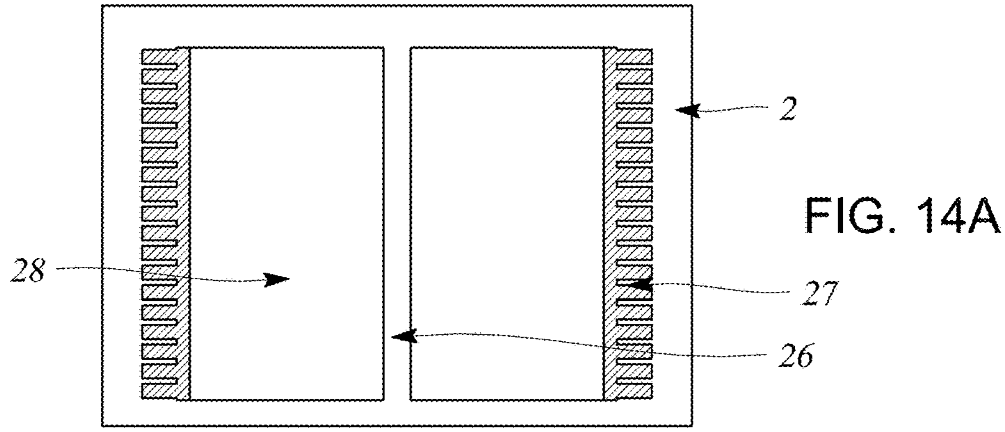
FIGS. 14A-14D are images of a simulation of pressure pulses driving the liquid medium in the vessel at different time periods in a compression operation.
Figure 14B:
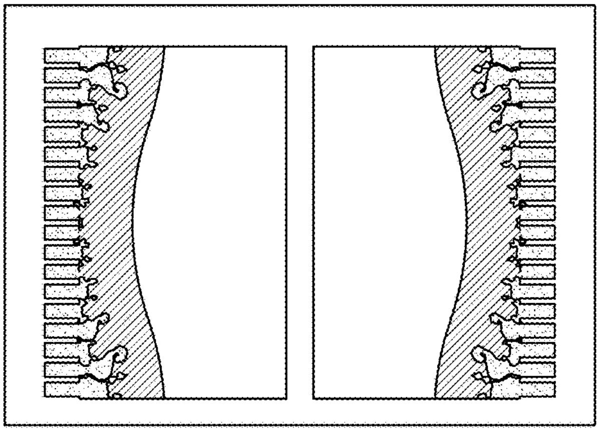
Figure 14C:
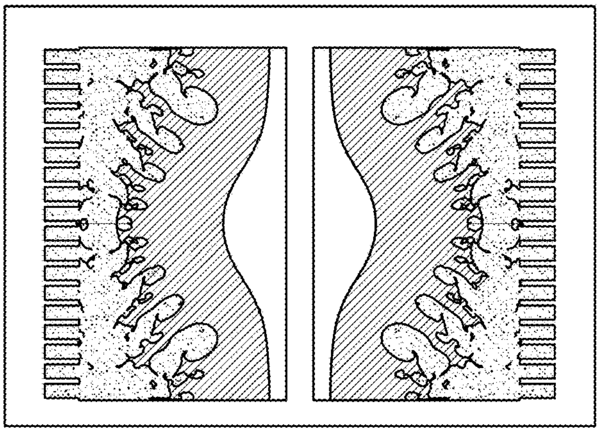
Figure 14D:
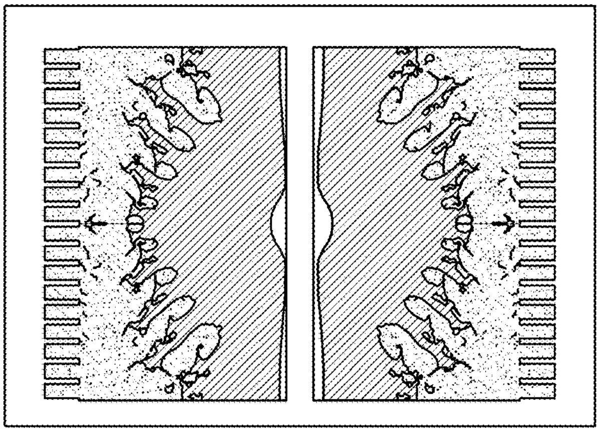

FIGS. 14A through 14D is a computational fluid dynamics simulation showing the time series of an experimental plasma compression operation, where the rotating liquid liner 27 has been radially compressed into the cavity 28 by a combined pressure pulse having a shaped pressure pulse trajectory. Structural elements include the rotating core 2 and a central shaft 26 along the axis or rotation. The simulation is rotationally symmetric about the vertical (z axis), with the rotating core 2 spinning about the z axis and the centripetal force on the liquid metal creating the cavity 28. FIG. 14A shows the rotating liquid liner 27 at the start of the compression cycle, which would occur when the driver and pusher pistons 15, 6 are in their initial start positions, as shown in FIG. 5A. As the driver pistons and pusher pistons proceed inward, the liquid in the pusher bores is displaced inward toward the center of the cavity 28 (FIGS. 14B and 14C). FIG. 14D shows the liquid liner 27 near the terminus of its collapse, which would occur when the driver and pusher pistons 15, 6 are in their terminal positions, as shown in FIG. 5E. The use of a liquid liner such as lithium or lead for example, protects the walls of the rotating core 2 and other structural components from damaging energetic particles that result from the fusion reaction, and circulation of the liquid liner out of the rotating core 2 also serves as a means for removing heat energy from the rotating core 2 and vessel 3.

This simulation shows how the control of the individual pressure pulses, in layers stacked in the Z direction, is used to shape the cavity during the compression. This simulation has different individual pressure pulses for each implosion driver, and this is visible by the stepped shape of the outer edge of the fluid in FIG. 14B. With the pressure pulse in the top and bottom layers developing earlier, and achieving a higher peak pressure than those layers closer to the equatorial layer (z=0), the top and bottom layers accelerate inwards earlier and/or faster than the equatorial layer. Starting from a cylindrical cavity, this differential trajectory creates a spheroidal or ovoidal cavity in the fluid, as can be seen in FIG. 14B. As shown in FIG. 14B-14D, the liquid liner 27 achieves ballistic travel after leaving the pusher bore in the implosion drivers, however ballistic travel is not a requirement for this design. The advantage of ballistic travel is that less volume of liquid liner is required for shaped liner collapse, and less volume results in lower mass of liquid liner and the corresponding reduction in centripetal force on the pusher pistons and stress within the rotating core.

As the compression proceeds, the liquid metal moving inwards conserves its angular momentum and begins to rotate faster and faster. This faster rotation increases the centripetal force on the fluid, eventually stopping the inward radial motion of the liquid metal before in contacts the central shaft 26. The top and bottom layers of the liquid metal, having been accelerated first, reach the center first and slow down before beginning to rebound (FIG. 14C). As the individual pressure pulses closer to the midplane continue inwards, this moves the point where the fluid is closest to the center shaft from the top and bottom layers towards the equator. The cavity inside the liquid metal therefore compresses spherically (both in radius and in Z directions), and not just cylindrically (in radius only). For compressing a plasma, the spherical compression geometry compresses the plasma in volume more than the equivalent cylindrical geometry, in the same amount of time. This higher compression results in more work being done on the plasma, adding more energy to heat the plasma.

This spherically shaped compression cavity is enabled by the control system 34 and rotating core 2 design that allows for differentially shaped pressure pulses in different compression driver layers. The tuning of the different pressure pulses in each layer, combined with the speed of rotation of the rotating core 2, allows the exact geometry of the collapsing cavity to be controlled and adjusted.

Figure 15:
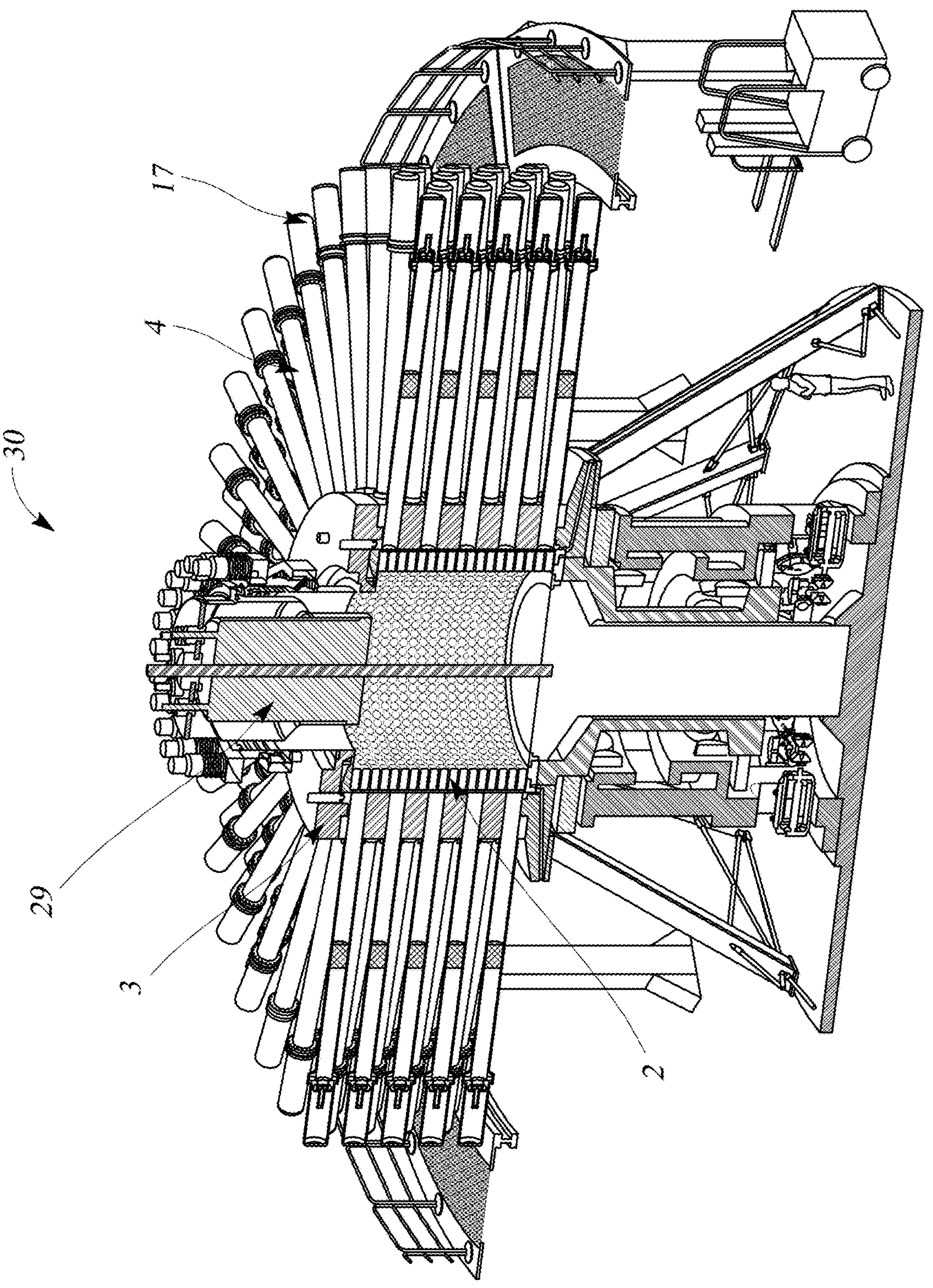
FIG. 15 is a cross-sectional diagram of the plasma compression device coupled to a plasma compression system.

FIG. 15 shows a partial cutaway diagram of an example of a plasma compression device as configured within a plasma compression system 1. The plasma generator 29 generates and injects plasma into the evacuated cavity (not shown) formed by the rotation of the liquid liner (not shown) by the rotating member 2. The liquid liner in some implementations may be molten metal, such as lithium or lead, or any mixture of molten material. When the plasma is correctly positioned within the evacuated cavity of the rotating liquid liner, the valves (not shown) release pressure from the accumulators 17 into the compression drivers 4 and drive the pusher pistons (not shown) inward, starting the collapse of the liquid liner. This collapse compresses and heats the plasma.

While particular elements, embodiments and applications of the present disclosure have been shown and described, it will be understood, that the scope of the disclosure is not limited thereto, since modifications can be made by those skilled in the art without departing from the scope of the present disclosure, particularly in light of the foregoing teachings. Thus, for example, in any method or process disclosed herein, the acts or operations making up the method/process may be performed in any suitable sequence and are not necessarily limited to any particular disclosed sequence. Elements and components can be configured or arranged differently, combined, and/or eliminated in various embodiments. The various features and processes described above may be used independently of one another, or may be combined in various ways. All possible combinations and sub-combinations are intended to fall within the scope of this disclosure. Reference throughout this disclosure to “some embodiments,” “an embodiment,” or the like, means that a particular feature, structure, step, process, or characteristic described in connection with the embodiment is included in at least one embodiment. Thus, appearances of the phrases “in some embodiments,” “in an embodiment,” or the like, throughout this disclosure are not necessarily all referring to the same embodiment and may refer to one or more of the same or different embodiments. Indeed, the novel methods and systems described herein may be embodied in a variety of other forms; furthermore, various omissions, additions, substitutions, equivalents, rearrangements, and changes in the form of the embodiments described herein may be made without departing from the spirit of the inventions described herein.

Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein.

Conditional language used herein, such as, among others, “can,” “could,” “might,” “may,” “e.g.,” and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without operator input or prompting, whether these features, elements and/or steps are included or are to be performed in any particular embodiment. No single feature or group of features is required for or indispensable to any particular embodiment. The terms “comprising,” “including,” “having,” and the like are synonymous and are used inclusively, in an open-ended fashion, and do not exclude additional elements, features, acts, operations, and so forth. Also, the term “or” is used in its inclusive sense (and not in its exclusive sense) so that when used, for example, to connect a list of elements, the term “or” means one, some, or all of the elements in the list.

The example calculations, simulations, results, graphs, values, and parameters of the embodiments described herein are intended to illustrate and not to limit the disclosed embodiments. Other embodiments can be configured and/or operated differently than the illustrative examples described herein.

What is claimed is:

1. A plasma compression system comprising:

(a) a plasma containment vessel comprising a vessel wall;

(b) a rotating core containing a liquid medium and operable to rotate the liquid medium about a rotational axis to form a liquid liner surrounding a cavity, the rotating core comprising an outer surface spaced from an inner surface of the vessel wall to define an annular gap containing a compression fluid and multiple layers of implosion drivers in fluid communication with the liquid medium and annular gap and spaced along an axial direction parallel to the rotational axis;

(c) multiple compression drivers in fluid communication with the annular gap and arranged in layers spaced along an axial direction parallel to the rotational axis, each compression driver layer operable to generate an individual pressure pulse in the compression fluid in a direction radial to and towards the rotational axis, the multiple layers of compression drivers generating multiple individual pressure pulses that collectively form a combined pressure pulse that actuates the implosion drivers to implode the liquid liner and compresses a plasma in the cavity; and (d) a controller communicative with the multiple layers of compression drivers and operable to generate the individual pressure pulses having at least one or more different shape, timing, and magnitude, such that the combined pressure pulse has a trajectory that varies along the axial direction.

2. The plasma compression system as claimed in claim 1 wherein each implosion driver layer comprises multiple implosion drivers each comprising a pusher bore and a pusher piston in fluid communication with the liquid medium.

3. The plasma compression system as claimed in claim 2 wherein each compression driver layer comprises a prime mover communicative with the controller and each compression driver comprises a driver bore and a driver piston movable by the prime mover.

4. The plasma compression system as claimed in claim 3, wherein each compression driver layer is in fluid communication with at least one implosion driver layer, wherein the driver piston of each compression driver is in fluid communication with the compression fluid such that movement of the driver pistons by the prime mover compresses the compression fluid, and wherein the least one implosion driver layer is in fluid communication with the compression fluid such that movement of the pusher pistons by the compressed compression fluid generates the individual pressure pulse in the liquid medium.

5. The plasma compression system as claimed in claim 2 wherein the prime mover comprises an accumulator containing a pressurized driver fluid and a valve communicative with the controller and operable to flow the pressurized driver fluid against the driver piston of each compression driver.

6. The plasma compression system as claimed in claim 2, wherein the prime mover comprises an electromagnetic source, electromagnetic coils at a wall of the driver bore, and an electrically-conductive element in the driver piston of each compression driver.

7. The plasma compression system as claimed in claim 6, wherein the electromagnetic coils extend along a length the driver bore, and the electromagnetic source is operable by the controller to adjust the magnetic field along the length of the driver bore thereby controlling the trajectory profile of the driver piston of each compression driver.

8. The plasma compression system as claimed in claim 6, further comprising at least one venting port in the driver bore of each compression driver for venting the driver fluid from the driver bore, the venting port comprising a venting valve operable by the controller to adjust a pressure applied to the driver piston by the driver fluid thereby controlling the trajectory profile of the driver piston.

9. The plasma compression system as claimed in claim 6, further comprising at least one venting port in the driver bore of each compression driver for venting the compression fluid from the driver bore, the venting port comprising a venting valve operable by the controller to adjust a pressure applied to the driver piston by the compression fluid thereby controlling the trajectory profile of the driver piston.

10. The plasma compression system as claimed in claim 6, further comprising electrodes at the distal end of the driver bore of each compression driver, the electrodes operable by the controller to generate an electrical arc to heat the compression fluid thereby controlling the trajectory profile of the driver piston.

11. The plasma compression system as claimed in claim 2, wherein the prime mover comprises a mechanical spring.

12. The plasma compression system as claimed in claim 2 wherein each compression driver comprises an accumulator for storing a pressurized gas and a drive valve in fluid communication with the accumulator and a vessel wall opening in the vessel wall;

wherein the controller is communicative with the drive valve and is operable to open the drive valve and discharge pressurized compression fluid from the accumulator into the annular gap thereby generating the individual pressure pulse in the compression fluid.

13. The plasma compression system of claim 12, wherein each compression driver further comprises a relief tank and a rebound valve in fluid communication with the relief tank and the vessel wall opening, and wherein the controller is communicative with the rebound valve is and operable to close the drive valve after the pressurized compression fluid has discharged into the annular gap then open the rebound valve, thereby allowing the pressurized compression fluid to flow from the annular gap into the relief tank.

14. The plasma compression system as claimed in claim 13, further comprising a controller in communication with the drive valve and rebound valve, the controller having a processor and a computer-readable memory having encoded thereon instructions that when executed by the processor causes the controller to open the drive valve and close the rebound valve during a compression phase of a compression shot wherein the pressurized gas flows from the accumulator into the annular gap, to keep the drive valve open and the rebound valve closed during a rebound recovery phase of the compression shot wherein some of the pressurized gas flows from the annular gap into the accumulator, and to close the drive valve and open the rebound valve during an energy dissipation phase wherein some other of the pressurized gas flows from the annular gap into the relief tank.

15. The plasma compression system as claimed in claim 12, further comprising one or more heating elements positioned within the accumulator, the one or more heating elements operable to heat the compression fluid prior to the compression shot.

16. The plasma compression system as claimed in claim 12, further comprising one or more electrodes positioned within the accumulator, the one or more electrodes operable to generate an electrical arc to heat the compression fluid during the compression shot.

17. The plasma compression system as claimed in claim 1 wherein the multiple layers of compression drivers comprise at least one central compression driver layer, and at least one top and bottom compression driver layers respectively above and below the at least one central compression driver layer, and wherein the controller is operable to control individual pressure pulses at the top and bottom compression driver layers with a larger magnitude or an earlier timing than the magnitude and timing of the at least one central compression driver layer.

18. The plasma compression system as claimed in claim 1 further comprising a plasma generator in fluid communication with the vessel and operable to inject a plasma into the cavity.

19. The plasma compression system as claimed in claim 1 wherein each compression driver layer comprises multiple compression drivers mounted to the vessel radially around the rotational axis.

20. The plasma compression system as claimed in claim 1 further comprising annular seals each extending around an exterior surface of the rotating core or an interior surface of the vessel wall, the annular seals spaced along an axial direction parallel to the rotational axis and between each compression driver layer.

21. The plasma compression system as claimed in claim 1 wherein the controller is operable to adjust at least one of the shape, timing and magnitude of the individual pressure pulses to create a combined pressure pulse having a spherical or ovoid trajectory.

22. A method for compressing plasma, comprising:

(a) rotating a rotating core containing a liquid medium about a rotational axis to form a liquid liner surrounding a cavity;

(b) injecting plasma into the cavity;

(c) generating multiple individual pressure pulses in the liquid medium from multiple layers of compression drivers spaced along an axial direction parallel to the rotational axis, each individual pressure pulse travelling in a direction perpendicular to and towards the rotational axis, the multiple individual pressure pulses collectively forming a combined pressure pulse that actuates multiple implosion drivers in the rotating core to implode the liquid liner and compresses the plasma in the cavity;

wherein one or more of the shape, timing, and magnitude of the individual pressure pulses of the multiple individual pressure pulses are different such that the combined pressure pulse has a trajectory that varies along the axial direction.

23. The method as claimed in claim 22 wherein the multiple individual pressure pulses comprises at least one central pressure pulse, at least one top pressure pulse above the at least one central pressure pulse, and at least one bottom pressure pulse below the at least one central pressure pulse, wherein the top and bottom pressure pulses have one or both of a larger magnitude and an earlier timing than the magnitude and timing of the at least one central pressure pulse.

24. The method as claimed in claim 23 wherein the timing and magnitude of the multiple individual pressure pulses create a combined pressure pulse having a spherical or ovoid trajectory.

* * * * *